US012786079B2

(12) United States Patent
Jung et al.

(10) Patent No.: US 12,786,079 B2
(45) Date of Patent: Nov. 3, 2026

(54) METHOD AND APPARATUS OF PERFORMING QOE MEASUREMENTS FOR MBS BROADCAST SERVICES IN THE NEXT MOBILE COMMUNICATION SYSTEM

(71) Applicant: Samsung Electronics Co., Ltd., Suwon-si (KR)

(72) Inventors: Sangyeob Jung, Suwon-si (KR); Seungbeom Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 321 days.

(21) Appl. No.: 18/459,232

(22) Filed: Aug. 31, 2023

(65) Prior Publication Data

US 2024/0106724 A1 Mar. 28, 2024

(30) Foreign Application Priority Data

Sep. 27, 2022 (KR) ........................ 10-2022-0122522

(51) Int. Cl.
*H04L 41/5067* (2022.01)
*H04W 4/06* (2009.01)
(Continued)

(52) U.S. Cl.
CPC ........... *H04L 41/5067* (2013.01); *H04W 4/06* (2013.01); *H04W 8/24* (2013.01); *H04W 24/08* (2013.01);
(Continued)

(58) Field of Classification Search
CPC .............. H04L 41/5067; H04W 76/40; H04W 24/08; H04W 4/06; H04W 8/24; H04W 24/10; H04W 76/27
See application file for complete search history.

(56) References Cited

U.S. PATENT DOCUMENTS

2021/0182214 A1* 6/2021 Moyer .................. G06F 12/122
2022/0217560 A1* 7/2022 Kumar .................. H04W 24/10
(Continued)

FOREIGN PATENT DOCUMENTS

WO 2022-180619 A1 9/2022

OTHER PUBLICATIONS

CATT, Discussion on MBS broadcast services, R2-2207822, 3GPP TSG RAN WG2 Meeting #119-e, Aug. 10, 2022.
(Continued)

*Primary Examiner* — Moo Jeong
*Assistant Examiner* — Chhian (Amy) Ling
(74) *Attorney, Agent, or Firm* — Jefferson IP Law, LLP

(57) ABSTRACT

The disclosure relates to a fifth-generation (5G) or a sixth-generation (6G) communication system for supporting higher data rates, especially, for performing quality of experience (QoE) measurement and reporting for multimedia broadcast service (MBS) services are provided. A method performed by a terminal in a wireless communication system is provided. The method includes receiving, from a base station, a message including information to configure an application layer measurement while the terminal is in a radio resource control (RRC) connected state, the information including a configuration of QoE measurements for multimedia broadcast service (MBS) broadcast, identifying whether the information further includes an indicator for identifying at least one RRC state for which the configuration is applied, and in case that the information further includes the indicator, performing the QoE measurements using the configuration, based on the indicator.

8 Claims, 15 Drawing Sheets

(51) Int. Cl.

| | |
|---|---|
| ***H04W 8/24*** | (2009.01) |
| ***H04W 24/08*** | (2009.01) |
| ***H04W 24/10*** | (2009.01) |
| ***H04W 76/27*** | (2018.01) |
| ***H04W 76/40*** | (2018.01) |

(52) U.S. Cl.

CPC .......... *H04W 24/10* (2013.01); *H04W 76/27* (2018.02); *H04W 76/40* (2018.02)

(56) References Cited

U.S. PATENT DOCUMENTS

| | | | | |
|---|---|---|---|---|
| 2022/0287132 | A1* | 9/2022 | Zhang | H04W 76/27 |
| 2023/0040746 | A1* | 2/2023 | Babaei | H04W 76/27 |
| 2023/0318941 | A1* | 10/2023 | Rune | H04L 41/5009 370/252 |
| 2023/0328843 | A1* | 10/2023 | Babaei | H04W 76/40 370/312 |
| 2024/0056872 | A1* | 2/2024 | Parichehrehteroujeni | H04L 41/0806 |
| 2025/0261011 | A1* | 8/2025 | Choi | H04W 24/10 |
| 2025/0324295 | A1* | 10/2025 | Zhu | H04W 24/08 |
| 2025/0330846 | A1* | 10/2025 | Kumar | H04W 24/10 |
| 2026/0006475 | A1* | 1/2026 | Wang | H04W 24/08 |

OTHER PUBLICATIONS

China Unicom, Discussion on MBS configuration and reporting for NR QoE in Rel-18, R2-2208622, 3GPP TSG RAN WG2 Meeting #119-e, Aug. 10, 2022.

Qualcomm Inc., QoE in RRC_IDLE and RRC_INACTIVE for MBS broadcast service, R3-224611, 3GPP TSG RAN WG3 Meeting #117-e, Aug. 9, 2022.

ZTE Corporation et al., Discussion on Rel-18 QoE measurement, R2-2208615, 3GPP TSG RAN WG2 Meeting #119-e, Aug. 10, 2022.

International Search Report dated Dec. 4, 2023, issued in International Patent Application No. PCT/KR2023/012967.

* cited by examiner

METHOD AND APPARATUS OF PERFORMING QOE MEASUREMENTS FOR MBS BROADCAST SERVICES IN THE NEXT MOBILE COMMUNICATION SYSTEM

CROSS-REFERENCE TO RELATED APPLICATION(S)

This application is based on and claims priority under 35 U.S.C. § 119(a) of a Korean patent application number 10-2022-0122522, filed on Sep. 27, 2022, in the Korean Intellectual Property Office, the disclosure of which is incorporated by reference herein in its entirety.

BACKGROUND

1. Field

The disclosure relates to a method and apparatus for performing quality of experience (QoE) measurement and reporting for multimedia broadcast service (MBS) services.

2. Description of Related Art

Fifth-generation (5G) mobile communication technologies define broad frequency bands such that high transmission rates and new services are possible, and can be implemented not only in "Sub 6 GHz" bands, such as 3.5 GHz, but also in "Above 6 GHz" bands referred to as mmWave including 28 GHz and 39 GHz. In addition, it has been considered to implement sixth-generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G.

In the initial state of 5G mobile communication technologies, in order to support services and to satisfy performance requirements in connection with enhanced mobile broadband, (eMBB), ultra reliable & low latency communications (URLLC), and massive machine-type communications (mMTC), there has been ongoing standardization regarding beamforming and massive multiple-input multiple output (MIMO) for alleviating radio-wave path loss and increasing radio-wave transmission distances in mmWave, numerology (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods, such as a low density parity check (LDPC) code for large-capacity data transmission and a polar code for highly reliable transmission of control information, L2 pre-processing, and network slicing for providing a dedicated network customized to a specific service.

Currently, there is ongoing discussion regarding improvement and performance enhancement of initial 5G mobile communication technologies in view of services to be supported by 5G mobile communication technologies, and there has been physical layer standardization regarding technologies, such as V2X for aiding driving determination by autonomous vehicles based on information regarding positions and states of vehicles transmitted by the vehicles and for enhancing user convenience,—new radio unlicensed (NR-U) aimed at system operations conforming to various regulation-related requirements in unlicensed bands, NR UE power saving, non-terrestrial network (NTN) which is UE-satellite direct communication for securing coverage in an area in which communication with terrestrial networks is impossible, and positioning.

Moreover, there has been ongoing standardization in wireless interface architecture/protocol fields regarding technologies, such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service fields regarding a 5G baseline architecture (for example, service based architecture or service based interface) for combining network functions virtualization (NFV) and software-defined networking (SDN) technologies, and mobile edge computing (MEC) for receiving services based on UE positions.

If such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended reality (XR) for efficiently supporting AR, VR, and the like (XR=AR+VR+MR), 5G performance improvement and complexity reduction by utilizing artificial intelligence (AI) and machine learning (ML), AI service support, metaverse service support, and drone communication.

Furthermore, such development of 5G mobile communication systems will serve as a basis for developing not only new waveforms for securing coverage in terahertz bands of 6G mobile communication technologies, full dimensional MIMO (FD-MIMO), multi-antenna transmission technologies, such as array antennas and large-scale antennas, metamaterial-based lenses and antennas for improving coverage of terahertz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, artificial intelligence (AI)-based communication technology for implementing system optimization by utilizing satellites and AI from the design stage and internalizing end-to-end AI support functions, and next-generation distributed computing technology for implementing services at levels of complexity exceeding the limit of user equipment (UE) operation capability by utilizing ultra-high-performance communication and computing resources.

For the purpose of supporting improved services, a network may configure quality of experience (QoE) measurement for a UE, and accordingly, the UE performing the measurement may report the QoE measurement result to the network. QoE configuration and measurement of the related art have been defined and used for unicast services, but QoE configuration and measurement can also be applied to multimedia broadcast and multicast services (MBMS) service types.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for performing quality of experience (QoE) measurement configuration and reporting for multimedia broadcast and multicast services (MBMS) broadcast/multicast.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes receiving, from a base station, a message including information to configure an application layer measurement while the terminal is in a radio resource control (RRC) connected state, the information including a configuration of QoE measurements for multimedia broadcast service (MBS) broadcast, identifying whether the information further includes an indicator for identifying at least one RRC state for which the configuration is applied, and in case that the information further includes the indicator, performing the QoE measurements using the configuration, based on the indicator.

In accordance with another aspect of the disclosure, a method performed by a base station in a wireless communication system is provided. The method includes generating information to configure an application layer measurement for a terminal, the information including a configuration of QoE measurements for MBS broadcast and an indicator for identifying at least one RRC state for which the configuration is applied, and transmitting, to the terminal in an RRC connected state, a message including the information.

In accordance with another aspect of the disclosure, a terminal in a wireless communication system is provided. The terminal includes a transceiver and at least one processor configured to control the transceiver to receive, from a base station, a message including information to configure an application layer measurement while the terminal is in a RRC connected state, the information including a configuration of QoE measurements for MBS broadcast, control the transceiver to identify whether the information further includes an indicator for identifying at least one RRC state for which the configuration is applied, and in case that the information further includes the indicator, perform the QoE measurements using the configuration, based on the indicator.

In accordance with another aspect of the disclosure, a base station in a wireless communication system is provided. The base station includes a transceiver and at least one processor configured to generate information to configure an application layer measurement for a terminal, the information including a configuration of QoE measurements for MBS broadcast and an indicator for identifying at least one RRC state for which the configuration is applied, and control the transceiver to transmit, to the terminal in an RRC connected state, a message including the information.

According to an embodiment of the disclosure, there is an effect of supporting QoE measurement and reporting for the MBMS service by providing appropriate configuration information according to the capabilities of a UE, each MBMS service type, each MBMS session, or the like.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description of the disclosure below, a detailed description of known functions or configurations incorporated herein will be omitted when it is determined that the description may make the subject matter of the disclosure unnecessarily unclear. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of descriptive convenience. Therefore, the disclosure is not limited by the terms as used below, and other terms referring to subjects having equivalent technical meanings may be used.

In the following description, terms and names defined in the 3rd generation partnership project long term evolution (3GPP LTE) standards will be used for the sake of descriptive convenience. However, the disclosure is not limited by these terms and names, and may be applied in the same way to systems that conform other standards. In the disclosure, the term "eNB" may be interchangeably used with the term "gNB". For example, a base station described as "eNB" may indicate "gNB".

Figure 1:
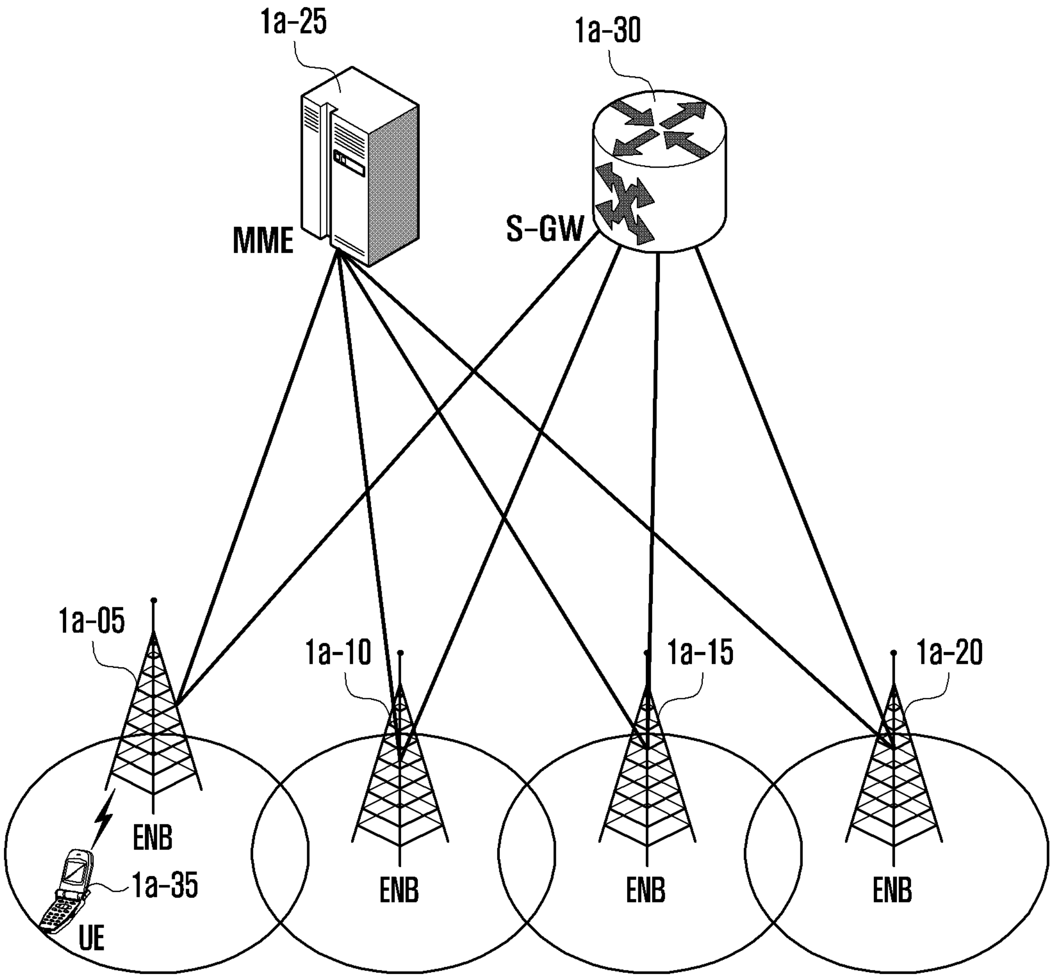
FIG. 1 is a diagram illustrating a structure of a long-term evolution (LTE) system according to an embodiment of the disclosure.

FIG. 1 is a diagram illustrating a structure of an LTE system according to an embodiment of the disclosure.

Referring to FIG. 1, a radio access network of the LTE system consists of a next-generation base station (evolved Node B, hereinafter, ENB, Node B or base station) 1*a*-05, 1*a*-10, 1*a*-15, and 1*a*-20, a mobility management entity (MME) 1*a*-25, and a serving-gateway (S-GW) 1*a*-30. A user equipment (hereinafter, UE or terminal) 1*a*-35 accesses an external network through the ENBs 1*a*-05 to 1*a*-20 and the S-GW 1*a*-30.

Referring to FIG. 1, the ENBs 1*a*-05 to 1*a*-20 corresponds to the existing Node B of a universal mobile telecommunication system (UMTS) system. The ENBs are connected to the UE 1*a*-35 through a radio channel and perform a more complex role than the existing Node B. In the long-term evolution (LTE) system, because all user traffic, including real-time services, such as voice over IP (VoIP) through Internet protocol, may be serviced through shared channels, a device for scheduling by collecting state information, such as buffer state of the UEs, available transmission power state, channel state, or the like, is required, and the ENBs 1*a*-05 to 1*a*-20 are responsible for this. One ENB typically controls multiple cells. For example, in order to implement a transmission rate of 100 Mbps, the LTE system uses, for example, orthogonal frequency division multiplexing (hereinafter, referred to as OFDM) in a 20 MHz bandwidth as a radio access technology. In addition, an adaptive modulation & coding (hereinafter, referred to as AMC) scheme determining a modulation scheme and a channel coding rate based on the channel state of the UE is applied.

The S-GW 1*a*-30 is a device that provides a data bearer, and generates or removes the data bearer under the control of the MME 1*a*-25. The MME is a device in charge of various control functions as well as a mobility management function for the UE, and connected to a plurality of base stations.

Figure 2:
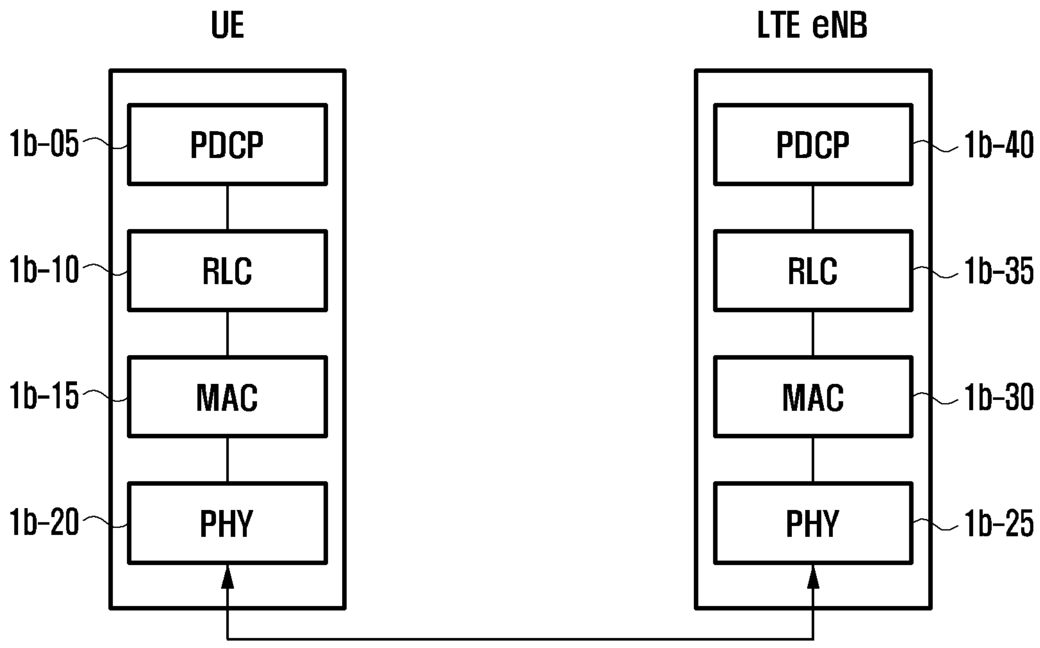
FIG. 2 is a diagram illustrating a radio protocol structure in an LTE system according to an embodiment of the disclosure.

FIG. 2 is a diagram illustrating a radio protocol structure in an LTE system according to an embodiment of the disclosure.

Referring to FIG. 2, the radio protocol of the LTE system consists of a packet data convergence protocol (PDCP) 1*b*-05 and 1*b*-40, a radio link control (RLC) 1*b*-10 and 1*b*-35, and a medium access control (MAC) 1*b*-15 and 1*b*-30 in the UE and ENB, respectively. The packet data convergence protocol (PDCP) 1*b*-05 and 1*b*-40 is responsible for operations of IP header compression/decompression, or the like. Main functions of PDCP are summarized as follows:

Header compression and decompression (ROHC only);
Transfer of user data;
In-sequence delivery of upper layer PDUs at PDCP re-establishment procedure for RLC AM;
For split bearers in DC (only support for RLC AM): PDCP PDU routing for transmission and PDCP PDU reordering for reception;
Duplicate detection of lower layer SDUs at PDCP re-establishment procedure for RLC AM;
Retransmission of PDCP SDUs at handover and, for split bearers in DC, of PDCP PDUs at PDCP data-recovery procedure, for RLC AM;
Ciphering and deciphering; and
Timer-based SDU discard in uplink.

The radio link control (hereinafter, referred to as RLC) 1*b*-10 and 1*b*-35 performs ARQ operation by reconfiguring a PDCP packet data unit (PDU) to an appropriate size. Main functions of the RLC are summarized below:

Transfer of upper layer PDUs;
Error Correction through ARQ (only for AM data transfer);
Concatenation, segmentation and reassembly of RLC SDUs (only for UM and AM data transfer);
Re-segmentation of RLC data PDUs (only for AM data transfer);
Reordering of RLC data PDUs (only for UM and AM data transfer);
Duplicate detection (only for UM and AM data transfer);
Protocol error detection (only for AM data transfer);
RLC SDU discard (only for UM and AM data transfer); and
RLC re-establishment.

The MACs 1*b*-15 and 1*b*-30 are connected to several RLC layers configured in one UE, and perform operations of multiplexing RLC PDUs into MAC PDUs and demultiplexing RLC PDUs from MAC PDUs. Main functions of the MAC are summarized as follows:

Mapping between logical channels and transport channels;

Multiplexing/demultiplexing of MAC SDUs belonging to one or different logical channels into/from transport blocks (TB) delivered to/from the physical layer on transport channels;

Scheduling information reporting;

Error correction through HARQ;

Priority handling between logical channels of one UE;

Priority handling between UEs by means of dynamic scheduling;

MBMS service identification;

Transport format selection; and

Padding.

The physical layers 1*b*-20 and 1*b*-25 channel-code and modulate upper layer data, make OFDM symbols and transmit the OFDM symbols through a radio channel, or demodulate and channel-decode the OFDM symbols received through the radio channel and transmit them to upper layers.

Figure 3:
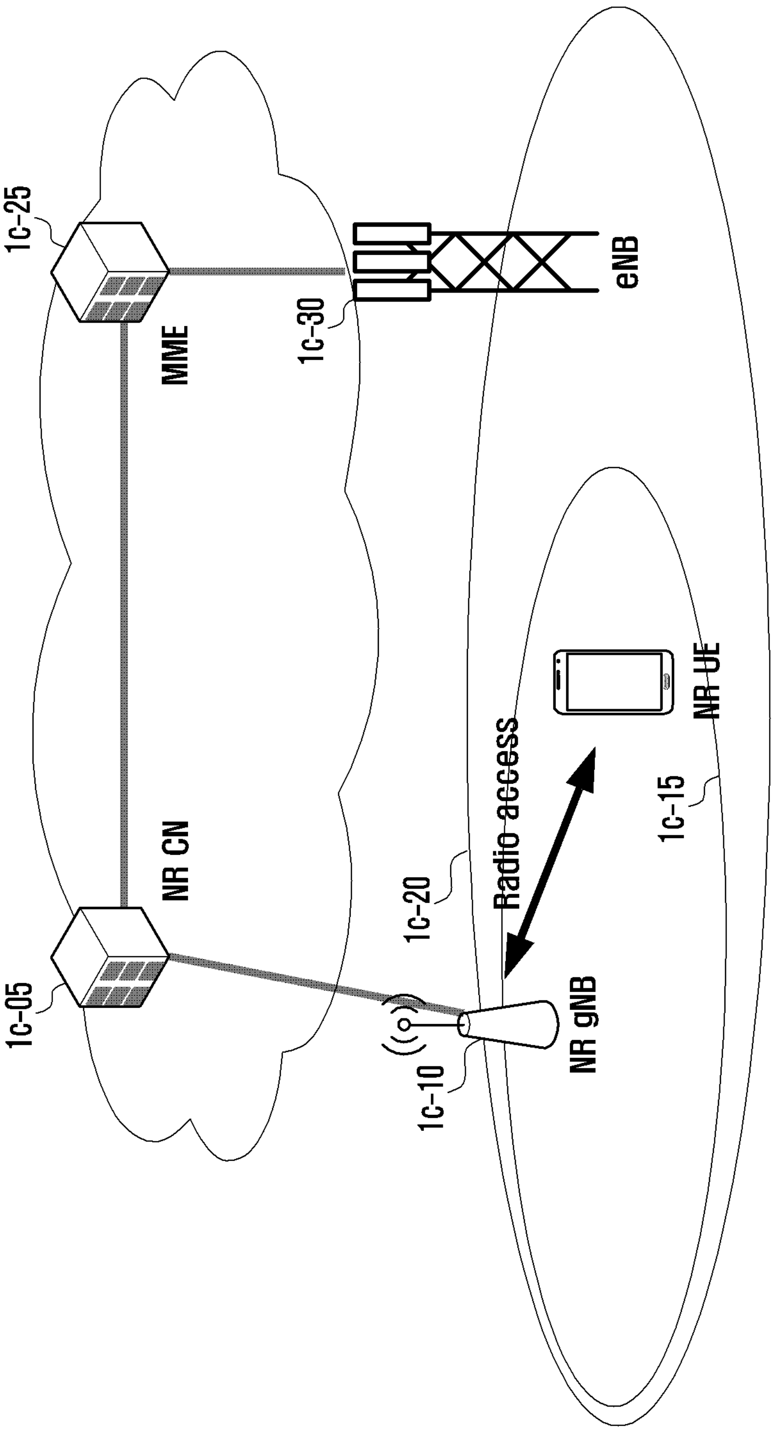
FIG. 3 is a diagram illustrating a structure of a next-generation mobile communication system according to an embodiment of the disclosure.

FIG. 3 is a diagram illustrating a structure of a next-generation mobile communication system according to an embodiment of the disclosure.

Referring to FIG. 3, a radio access network of the next-generation mobile communication system (hereinafter, NR or 5G) is including a next-generation base station (new radio node B, hereinafter, NR gNB or NR base station) 1*c*-10 and an NR CN 1*c*-05. A new radio user equipment (hereinafter, NR UE or terminal) 1*c*-15 accesses an external network outside of a network area 1*c*-20 through the NR gNB 1*c*-10 and the NR CN 1*c*-05.

Referring to FIG. 3, the NR gNB 1*c*-10 corresponds to an Evolved Node B (eNB) of the existing LTE system. The NR gNB is connected to the NR UE 1*c*-15 through a radio channel and may provide a service superior to that of the existing Node B. In the next-generation mobile communication system, because all user traffic is serviced through the shared channel, a device for scheduling by collecting state information, such as a buffer state of the UEs, an available transmission power state, a channel state, or the like, is required, and the NR NB 1*c*-10 is responsible for this. One NR gNB usually controls multiple cells. A bandwidth greater than or equal to the existing maximum bandwidth may be applied in order to implement ultra-high-speed data transmission compared with current LTE, and additional beamforming technology may be grafted by using orthogonal frequency division multiplexing (hereinafter, referred to as OFDM) as a radio access technology. In addition, an adaptive modulation & coding (hereinafter, referred to as AMC) scheme for determining a modulation scheme and a channel coding rate according to the channel state of the UE is applied.

The NR CN 1*c*-05 performs functions, such as mobility support, bearer configuration, QoS configuration, and the like. The NR CN is a device in charge of various control functions as well as a mobility management function for the UE, and is connected to a plurality of base stations. In addition, the next-generation mobile communication system may be linked with the existing LTE system, and the NR CN is connected to the MME 1*c*-25 through a network interface. The MME is connected to the existing base station eNB 1*c*-30.

Figure 4:
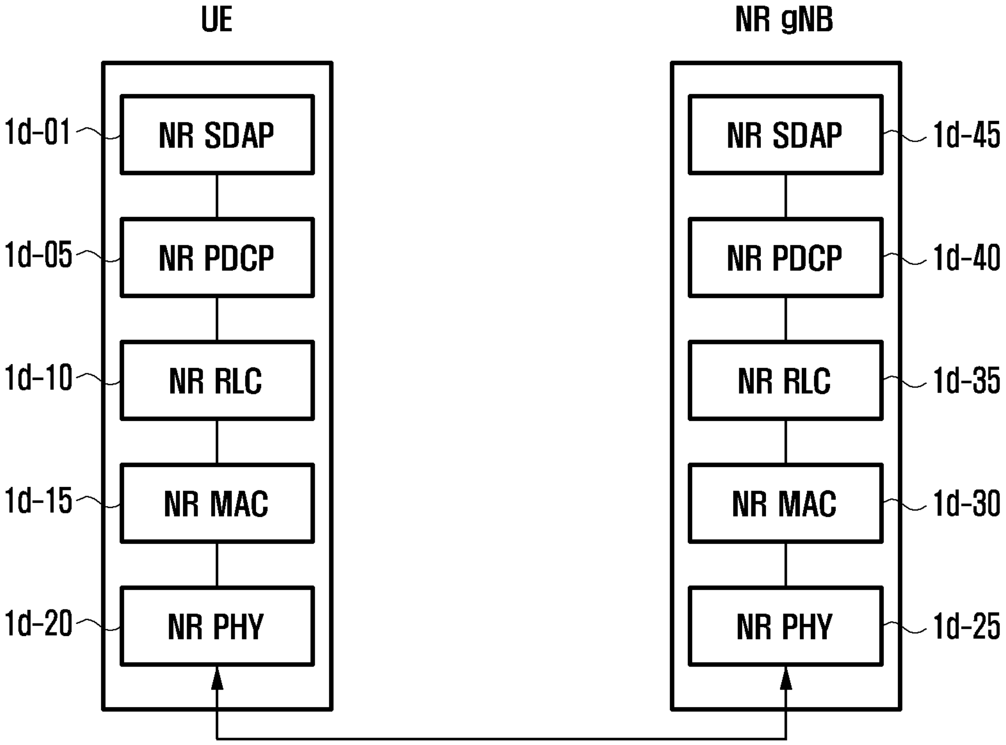
FIG. 4 is a diagram illustrating a radio protocol structure of a next-generation mobile communication system according to an embodiment of the disclosure.

FIG. 4 is a diagram illustrating a radio protocol structure of a next-generation mobile communication system according to an embodiment of the disclosure.

Referring to FIG. 4, the radio protocol of the next-generation mobile communication system consists of an NR service data adaptation protocol (SDAP) 1*d*-01 and 1*d*-45, NR PDCP 1*d*-05 and 1*d*-40, NR RLC 1*d*-10 and 1*d*-35, and NR MAC 1*d*-15 and 1*d*-30 in a UE and an NR base station, respectively.

Main functions of the NR SDAP 1*d*-01 and 1*d*-45 may include some of the following functions:

Transfer of user plane data;

Mapping between a QoS flow and a DRB for both DL and UL;

Marking QoS flow ID in both DL and UL packets; and

Reflective QoS flow to DRB mapping for the UL SDAP PDUs.

With respect to the SDAP layer, the UE may be configured with a radio resource control (RRC) message whether to use a SDAP layer header or the function of the SDAP layer for each PDCP layer, for each bearer, or for each logical channel, and when the SDAP header is configured, the UE may instruct the UE to update or reconfigure mapping information for uplink and downlink QoS flows and data bearers with a non-access stratum (NAS) QoS reflected configuration 1*a*-bit indicator (NAS reflective QoS) and an access stratum (AS) QoS reflected configuration 1*a*-bit indicator (AS reflective QoS) of the SDAP header. The SDAP header may include QoS flow ID information indicating QoS. The QoS information may be used as data processing priority, scheduling information, or the like, to support a smooth service.

Main function of the NR PDCP 1*d*-05 and 1*d*-40 may include some of the following functions:

Header compression and decompression (ROHC only);

Transfer of user data;

In-sequence delivery of upper layer PDUs;

Out-of-sequence delivery of upper layer PDUs;

PDCP PDU reordering for reception;

Duplicate detection of lower layer SDUs;

Retransmission of PDCP SDUs;

Ciphering and deciphering; and

Timer-based SDU discard in uplink.

In the above description, the reordering function of the NR PDCP may refer to a function of reordering PDCP PDUs received from a lower layer in order based on a PDCP sequence number (SN), and may include a function to transmit data to the upper layer in the rearranged order or a function to directly transmit data without considering the order, a function to record lost PDCP PDUs by rearranging the order, a function to report the state of lost PDCP PDUs to the transmitting side, and a function to request retransmission for lost PDCP PDUs.

The main function of the NR RLC 1*d*-10 and 1*d*-35 may include some of the following functions:

Transfer of upper layer PDUs;

In-sequence delivery of upper layer PDUs;

Out-of-sequence delivery of upper layer PDUs;

Error Correction through ARQ;

Concatenation, segmentation and reassembly of RLC SDUs;

Re-segmentation of RLC data PDUs;

Reordering of RLC data PDUs;

Duplicate detection;

Protocol error detection;

RLC SDU discard; and

RLC re-establishment.

In the above description, the in-sequence delivery of the NR RLC refers to a function of sequentially delivering RLC SDUs received from a lower layer to an upper layer, may include a function to reassemble and deliver divided RLC SDUs in a case where originally one RLC SDU is divided into several RLC SDUs and received, may include a function to rearrange received RLC PDUs based on RLC sequence number (SN) or PDCP sequence number (SN), a function to reorder and record lost RLC PDUs, a function to report the state of lost RLC PDUs to the transmitting side, a function to request retransmission of lost RLC PDUs, a function of sequentially delivering only the RLC SDUs before the lost RLC SDU to the upper layer when there is a missing RLC SDU, or may include a function of sequentially delivering all RLC SDUs received before the timer starts to the upper layer if a predetermined timer has expired even if there is a lost RLC SDU, or may include a function of sequentially delivering all RLC SDUs received so far to the upper layer if a predetermined timer has expired even if there is a lost RLC SDU. In addition, in the above, RLC PDUs may be processed in the order they are received (regardless of the order of serial numbers and sequence numbers, in the order of arrival) and delivered to the PDCP device out of order (out-of-sequence delivery), and in the case of segments, segments stored in the buffer or to be received later are received, reconstructed into one complete RLC PDU, processed, and transmitted to the PDCP device. The NR RLC layer may not include a concatenation function, and the function may be performed by the NR MAC layer or replaced with a multiplexing function of the NR MAC layer.

In the above description, the out-of-sequence delivery of the NR RLC device refers to a function of directly delivering RLC SDUs received from a lower layer to an upper layer regardless of order, and may include a function of reassembling and delivering in a case where originally one RLC SDU is divided into several RLC SDUs and received, and a function of storing the RLC SN or PDCP SN of the received RLC PDUs, arranging the order, and recording the lost RLC PDUs.

The NR MAC 1*d*-15 and 1*d*-30 may be connected to several NR RLC layers configured in one UE, and the main function of the NR MAC may include some of the following functions:

- Mapping between logical channels and transport channels;
- Multiplexing/demultiplexing of MAC SDUs;
- Scheduling information reporting;
- Error correction through HARQ;
- Priority handling between logical channels of one UE;
- Priority handling between UEs by means of dynamic scheduling;
- MBMS service identification;
- Transport format selection; and
- Padding.

The NR PHY layers 1*d*-20 and 1*d*-25 may channel-code and modulate upper layer data, make OFDM symbols and transmit the OFDM symbols through a radio channel, or may demodulate and channel-decode the OFDM symbols received through the radio channel and transmit them to upper layers.

Figure 5:
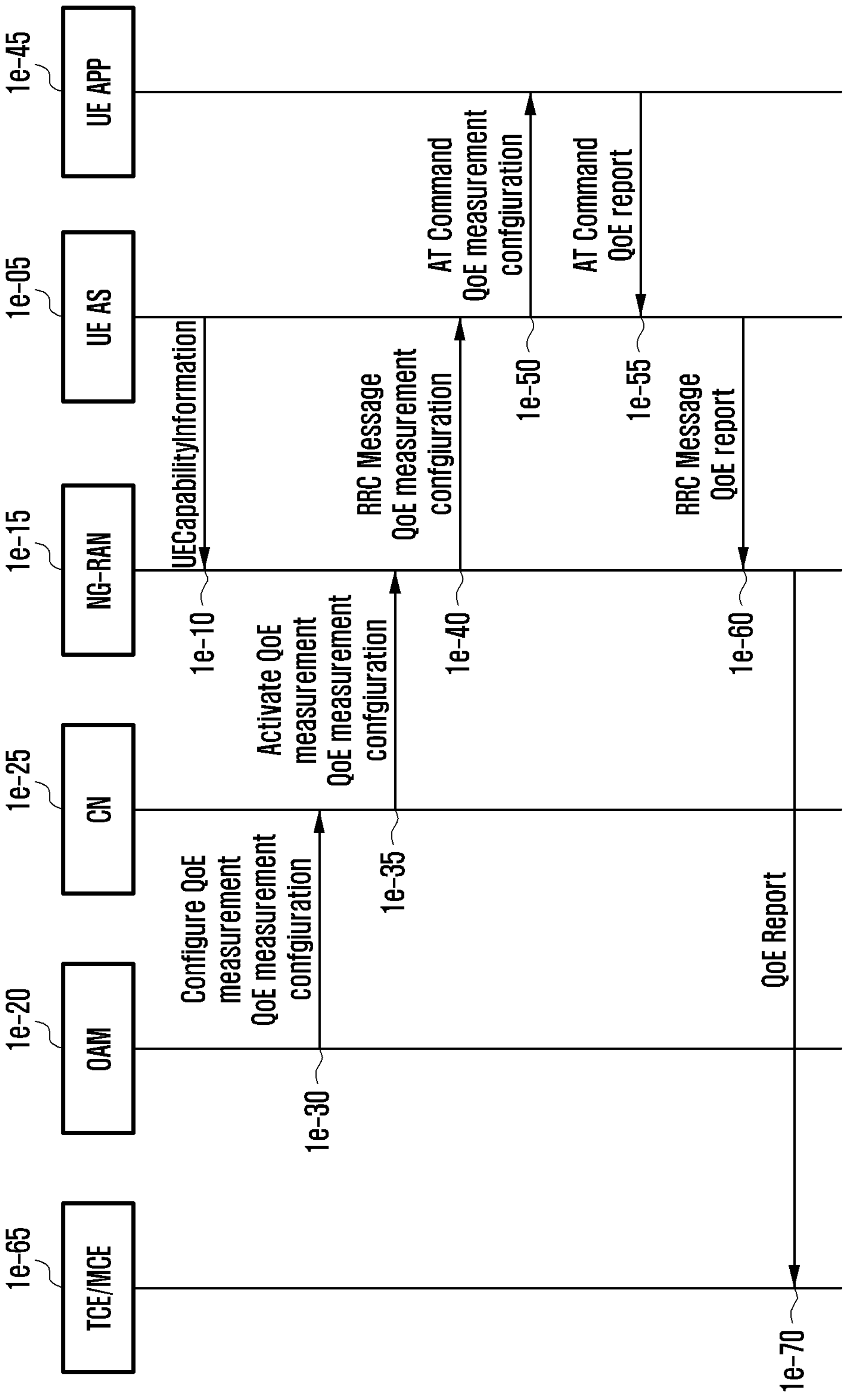
FIG. 5 is a flowchart illustrating a procedure for configuring/reporting signaling-based quality of experience (QoE) measurement according to an embodiment of the disclosure.

FIG. 5 is a flowchart illustrating a procedure for configuring/reporting signaling-based QoE measurement according to an embodiment of the disclosure.

Referring to FIG. 5, a UE access stratum (AS) 1*e*-05 may store information indicating which quality of experience (QoE) measurement is supported through application layers measurements in a UE capability information message (UECapabilityInformation) and transmit the same to the base station 1*e*-15 in operation 1*e*-10. Additionally, the message may include capability information on whether the UE AS 1*e*-05 may divide and transmit an RRC message (MeasurementReportAppLayer) reporting the QoE measurement result to the base station 1*e*-15. As an example, the UE capability information message may include parameters as shown in Table 1 below.

TABLE 1

```
AppLayerMeasParameters-r17 ::=   SEQUENCE {
   qoe-Streaming-MeasReport-r17   ENUMERATED {supported}
OPTIONAL,
   qoe-MTSI-MeasReport-r17   ENUMERATED {supported}
OPTIONAL,
   qoe-VR-MeasReport-r17   ENUMERATED {supported}
OPTIONAL,
   ran-VisibleQoE-Streaming-MeasReport-r17   ENUMERATED {supported}
OPTIONAL,
   ran-VisibleQoE-VR-MeasReport-r17   ENUMERATED {supported}
OPTIONAL,
   ul-MeasurementReportAppLayer-Seg-r17   ENUMERATED {supported}
OPTIONAL,
   ...
}
```

Additionally, the UE capability information message may include information on whether the UE supports QoE measurement through application layer measurements for multimedia broadcast multicast services (MBMS), extended reality (XR), and the like. In this case, whether the QoE measurement is supported may be stored separately in the UE capability information message for each of multimedia broadcast services and multimedia multicast services, or may be commonly stored in the UE capability information message without distinction between multimedia broadcast services and multimedia multicast services. Additionally, whether the QoE measurement for multimedia broadcast services is supported may be included in the message according to the RRC state. As an example, the QoE measurement may be supported for multimedia broadcast services only in RRC connected mode (RRC_CONNECTED), or may be supported for multimedia broadcast services only in RRC idle mode (RRC_IDLE) and RRC inactive mode (RRC_INACTIVE), or may be supported for multimedia broadcast services regardless of the RRC state.

In operation 1*e*-30, an operations administration and maintenance (OAM) 1*e*-20 may provide QoE measurement configuration information to a core network (CN) 1*e*-25.

In operation 1*e*-35, the CN 1*e*-25 may activate QoE measurement by transmitting the QoE measurement configuration information received in operation 1*e*-30 to the base station 1*e*-15.

In operation 1*e*-40, the base station 1*e*-15 may store the QoE measurement configuration information received in operation 1*e*-35 in a predetermined RRC message (e.g., RRCReconfiguration or RRCResume) and transmit the same to the UE AS 1e-05. The QoE measurement configuration information (AppLayerMeasConfig) stored in the predetermined RRC message may include parameters as shown in Table 2 below.

TABLE 2

```
AppLayerMeasConfig-r17 ::=   SEQUENCE {
   measConfigAppLayerToAddModList-r17   SEQUENCE (SIZE
(1..maxNrofAppLayerMeas-r17)) OF MeasConfigAppLayer-r17   OPTIONAL, --
Need N
   measConfigAppLayerToReleaseList-r17 SEQUENCE (SIZE
(1..maxNrofAppLayerMeas-r17)) OF MeasConfigAppLayerId-r17   OPTIONAL, --
Need N
   rrc-SegAllowed-r17   ENUMERATED {enabled}
OPTIONAL, -- Need R
   ...
}
MeasConfigAppLayer-r17 ::=   SEQUENCE {
   measConfigAppLayerId-r17   ,
   measConfigAppLayerContainer-r17   OCTET STRING (SIZE (1..8000))
OPTIONAL, -- Need N
   serviceType-r17   ENUMERATED {streaming, mtsi, vr, spare5,
spare4, spare3, spare2, spare1}   OPTIONAL, -- Need M
   pauseReporting   BOOLEAN
OPTIONAL, -- Need M
   transmissionOfSessionStartStop   BOOLEAN
OPTIONAL, -- Need M
   ran-VisibleParameters-r17   SetupRelease {RAN-VisibleParameters-r17}
OPTIONAL, -- Need M
   ...
}
RAN-VisibleParameters-r17 ::=   SEQUENCE {
   ran-VisiblePeriodicity-r17   ENUMERATED {ms120, ms240, ms480,
ms640, ms1024}   OPTIONAL, -- Need S
   numberOfBufferLevelEntries-r17   INTEGER (1..8)
OPTIONAL, -- Need R
   reportPlayoutDelay ForMediaStartup-r17 BOOLEAN
OPTIONAL, -- Need M
   ...
}
-- TAG-APPLAYERMEASCONFIG-STOP
-- ASN1STOP
```

| AppLayerMeasConfig field descriptions |
|---|
| measConfigAppLayerContainer<br>The field contains configuration of application layer measurements, see Annex L (normative) in TS 26.247 [68], clause 16.5 in TS 26.114 [69] and TS 26.118 [70]. |
| pauseReporting<br>The field indicates whether the transmission of measReportAppLayerContainer is paused or not. |
| ran-VisibleParameters<br>The field indicates whether RAN visible application layer measurements shall be reported or not. The field is optionally present when serviceType is set to streaming or vr. Otherwise, it is absent. |
| rrc-SegAllowed<br>This field indicates that RRC segmentation of MeasurementReportAppLayer is allowed. It may be present only if the UE supports RRC segmentation of the MeasurementReportAppLayer message in UL. |
| service Type<br>Indicates the type of application layer measurement. Value streaming indicates Quality of Experience Measurement Collection for streaming services (see TS 26.247 [68]), value mtsi indicates Quality of Experience Measurement Collection for MTSI (see TS 26.114 [69]). value vr indicates Quality of Experience Measurement Collection for VR service (see TS 26.118 [70]). The network always configures serviceType when application layer measurements are initially configured and at fullConfig. |
| transmission OfSessionStartStop<br>The field indicates whether the UE shall transmit indications when sessions in the application layer start and stop. The UE transmits a session start indication upon configuration of this field if a session already has started in the application layer. |

| RAN-VisibleParameters field descriptions |
|---|
| numberOfBufferLevelEntries<br>The field contains the maximum number of buffer level entries that can be reported for RAN visible application layer measurements. |

TABLE 2-continued

| |
|---|
| ran-VisiblePeriodicity<br>The field indicates the periodicity of RAN visible reporting. Value ms120 indicates 120 ms, value ms240 indicates 240 ms and so on.<br>reportPlayoutDelay ForMediaStartup<br>The field indicates whether the UE shall report Playout Delay for Media Startup for RAN visible application layer measurements. |

Additionally, the AppLayerMeasConfig may also include QoE measurement configuration information for multimedia broadcast services. As an example, multimedia broadcast services may be indicated in the serviceType included in the AppLayerMeasConfig, or the QoE measurement configuration information for multimedia broadcast services may be included by introducing a separate indicator, or an indicator regarding whether to measure QoE for each MBS session (e.g., mbs-SessionList) may be included. The QoE measurement configuration information for multimedia broadcast services may be applied to all RRC states (RRC_IDLE, RRC_INACTIVE, and RRC_CONNECTED) of the UE or may be applied to at least one RRC state. For example, to which RRC states (any combination of RRC_IDLE, RRC_INACTIVE and RRC_CONNECTED) the QoE measurement configuration information for multimedia broadcast services is applied may be indicated in the AppLayerMeasConfig. Alternatively, a new timer value for representing a QoE measurement execution period for multimedia broadcast services may be included. For example, when the new timer value is included, the UE may drive or re-drive a new timer with a new timer value received when receiving the AppLayerMeasConfig from the base station, or may drive or re-drive the new timer with the received new timer value when transitioning to the RRC idle mode or the RRC inactive mode. When the driven new timer expires, the UE may release the QoE measurement configuration information for multimedia broadcast services. For reference, the UE AS receiving the AppLayerMeasConfig may perform the procedure in Table 3 below.

TABLE 3

1>if measConfigAppLayerToReleaseList is included in appLayerMeasConfig within RRCReconfiguration or RRCResume:
  2>for each measConfigAppLayerId value included in the measConfigAppLayerToReleaseList:
    3>forward the measConfigAppLayerId and inform upper layers about the release of the application layer measurement configuration including any RAN visible application layer measurement configuration;
    3>discard any application layer measurement report received from upper layers;
    3>consider itself not to be configured to send application layer measurement report for the measConfigAppLayerId.
1>if measConfigAppLayerToAddModList is included in appLayerMeasConfig within RRCReconfiguration or RRCResume:
  2>for each measConfigAppLayerId value included in the measConfigAppLayerToAddModList:
    3>if measConfigAppLayerContainer is included for the corresponding MeasConfigAppLayer configuration:
      4>forward the measConfigAppLayerContainer, the measConfigAppLayerId and the serviceType to upper layers considering the serviceType;
    3>consider itself to be configured to send application layer measurement report for the measConfigAppLayerId in accordance with 5.7.16;
    3>forward the transmissionOfSessionStartStop, if configured, and measConfigAppLayerId to upper layers considering the serviceType;
    3>if ran-VisibleParameters is set to setup and the parameters have been received:
      4>forward the measConfigAppLayerId, the ran-VisiblePeriodicity, if configured, the numberOfBufferLevelEntries, if configured, and the reportPlayoutDelayForMediaStartup, if configured, to upper layers considering the serviceType;
    3>else if ran-VisibleParameters is set to release:
      4>forward the measConfigAppLayerId and inform upper layers about the release of the RAN visible application layer measurement configuration;
    3>if pause Reporting is set to true:
      4>if at least one segment, but not all segments, of a segmented MeasurementReportAppLayer message containing an application layer measurement report associated with the measConfigAppLayerId has been submitted to lower layers for transmission:
        5>submit the remaining segments of the MeasurementReportAppLayer message to lower layers for transmission;
      4>suspend submitting application layer measurement report containers to lower layers for the application layer measurement configuration associated with the measConfigAppLayerId;
      4>store any previously or subsequently received application layer measurement report containers associated with the measConfigAppLayerId for which no segment, or full message, has been submitted to lower layers for transmission;

TABLE 3-continued

```
3>else if pause Reporting is set to false and if transmission of application
   layer measurement report containers has previously been suspended for
   the application layer measurement configuration associated with the
   measConfigAppLayerId:
   4>submit stored application layer measurement report containers to lower
      layers, if any, for the application layer measurements configuration
      associated with the measConfigAppLayerId;
   4>resume submitting application layer measurement report containers to
      lower layers for the application layer measurement configuration
      associated with the measConfigAppLayerId;
```

In operation 1*e*-50, the UE AS 1*e*-05 receiving the AppLayerMeasConfig may deliver the configuration information to an application layer (UE APP) 1*e*-45 of the UE through an AT command.

In operation 1*e*-55, the UE APP 1*e*-45 may perform QoE measurement according to the configuration information received in in operation 1*e*-50, and report the result of the measurement to the UE AS 1*e*-05 through the AT command according to the configuration information.

In operation 1*e*-60, the UE AS 1*e*-05 may report the measurement result to the base station 1*e*-15 through a predetermined RRC message (e.g., MeasReportAppLayer) based on the information received in operation 1*e*-55. For reporting of QoE measurement results, signaling radio bearer (SRB) 4 may be used. The predetermined RRC message may include parameters as shown in Table 4 below.

TABLE 4

```
MeasurementReportAppLayer-r17 ::=   SEQUENCE {
   criticalExtensions   CHOICE {
      measurementReportAppLayer-r17   MeasurementReportAppLayer-r17-IEs,
      criticalExtensionsFuture   SEQUENCE { }
   }
}
MeasurementReportAppLayer-r17-IEs ::=   SEQUENCE {
   measurementReportAppLayerList-r17   MeasurementReportAppLayerList-
r17,
   lateNonCriticalExtension   OCTET STRING
OPTIONAL,
   nonCriticalExtension   SEQUENCE{ }
OPTIONAL
}
MeasurementReportAppLayerList-r17 ::= SEQUENCE (SIZE
(1..maxNrofAppLayerMeas-r17)) OF MeasReportAppLayer-r17
MeasReportAppLayer-r17 ::=   SEQUENCE {
   measConfigAppLayerId-r17   MeasConfigAppLayerId-r17,
   measReportAppLayerContainer-r17   OCTET STRING
OPTIONAL,
   appLayerSessionStatus-r17   ENUMERATED {started, stopped}
OPTIONAL,
   ran-VisibleMeasurements-r17   RAN-VisibleMeasurements-r17
OPTIONAL
}
RAN-VisibleMeasurements-r17 ::=   SEQUENCE {
   appLayerBufferLevelList-r17   SEQUENCE (SIZE (1..8)) OF
AppLayerBufferLevel-r17   OPTIONAL,
   playoutDelay ForMediaStartup-r17   INTEGER (0..30000)
OPTIONAL,
   pdu-SessionIdList-r17   SEQUENCE (SIZE (1..maxNrofPDU-Sessions-
r17)) OF PDU-SessionID   OPTIONAL,
   ...
}
```

As an example, the UE AS 1*e*-05 may transmit the predetermined RRC message including the QoE measurement result report to the base station 1*e*-15 based on the procedure in Table 5 below.

TABLE 5

```
1>for each measConfigAppLayerId:
   2>if the UE AS has received application layer measurement report from upper
      layers which has not been transmitted; and
   2>if the application layer measurement reporting has not been suspended for
      the measConfigAppLayerId associated with the application layer
      measurement report according to clause 5.3.5.13d:
      3>set the measReportAppLayerContainer in the
         MeasurementReportAppLayer message to the received value in the
         application layer measurement report;
```

TABLE 5-continued

| |
|---|
| 2>set the measConfigAppLayerId in the MeasurementReportAppLayer message to the value of the measConfigAppLayerId received together with application layer measurement report information; |
| 2>if session start or stop information has been received from upper layers for the measConfigAppLayerId: |
| 3>set the appLayerSessionStatus to the received value of the application layer measurement information; |
| 2>if RAN visible application layer measurement report has been received from upper layers: |
| 3>for each appLayerBufferLevel value in the received RAN visible application layer measurement report: |
| 4>set the appLayerBufferLevel values in the appLayerBufferLevelList to the buffer level values received from the upper layer in the order with the first appLayerBufferLevel value set to the newest received buffer level value, the second appLayerBufferLevel value set to the second newest received buffer level value, and so on until all the buffer level values received from the upper layer have been assigned or the maximum number of values have been set according to appLayerBufferLevel, if configured; |
| 3>set the playoutDelayForMediaStartup to the received value in the RAN visible application layer measurement report, if any; |
| 3>for each PDU session ID value indicated in the received RAN visible application layer measurement report, if any: |
| 4>set the PDU-SessionID field in the pdu-SessionIdList to the indicated PDU session ID value; |
| 2>if the encoded RRC message is larger than the maximum supported size of one PDCP SDU specified in TS 38.323 [5]: |
| 3>if the RRC message segmentation is enabled based on the field rrc-SegAllowed received in appLayerMeasConfig: |
| 4>initiate the UL message segment transfer procedure as specified in clause 5.7.7; |
| 3>else: |
| 4>discard the RRC message; |
| 2>else: |
| 3>submit the MeasurementReportAppLayer message to lower layers for transmission upon which the procedure ends. |

In operation 1*e*-70, the base station 1*e*-15 may deliver the measurement result report received in operation 1*e*-60 to the configured final destination (TCE or MCE) 1*e*-65.

Figure 6:
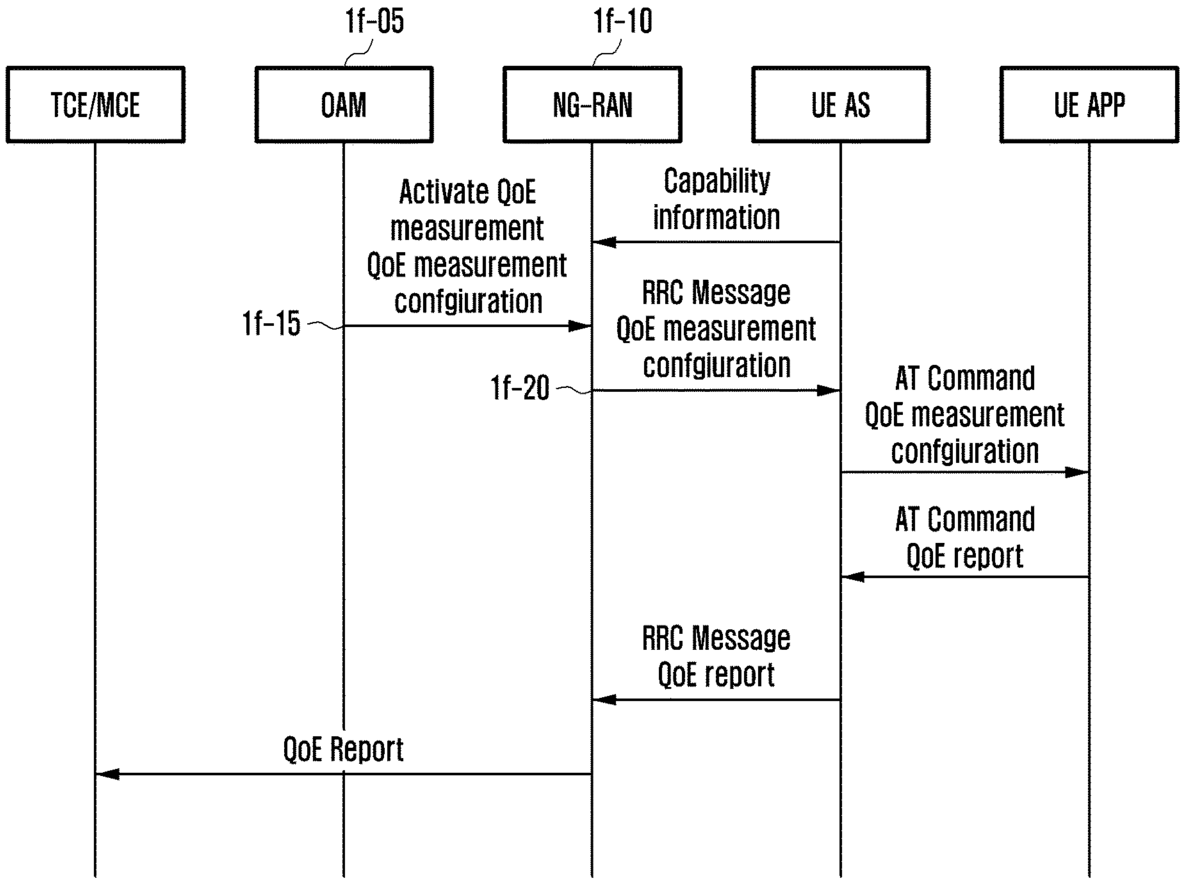
FIG. 6 is a flowchart illustrating a procedure for configuring/reporting management-based QoE measurement according to an embodiment of the disclosure.

FIG. 6 is a flowchart illustrating a procedure for configuring/reporting management-based QoE measurement according to an embodiment of the disclosure.

Referring to FIG. 6, the management-based QoE configuring/reporting procedure is substantially similar to the signaling-based procedure (FIG. 5). Accordingly, in this specification, only the difference between the management-based method is described below, and other procedures and descriptions may be regarded as the same as those of FIG. 5.

In the management-based method, an OAM 1*f*-05 may directly transmit the QoE measurement configuration to a base station 1*f*-10 without going through a CN to activate the QoE measurement in operation 1*f*-15. Upon receiving this, the base station 1*f*-10 searches for a single UE or a plurality of UEs that meet various conditions (e.g., area scope, application layer capability, and service type). The base station 1*f*-10 may deliver the QoE measurement configuration to each of the UEs through an RRC message (e.g., RRCReconfiguration or RRCResume) in operation 1*f*-20. Other procedures and message types may be regarded as the same as the description of FIG. 5 (signaling-based method).

Figure 7:
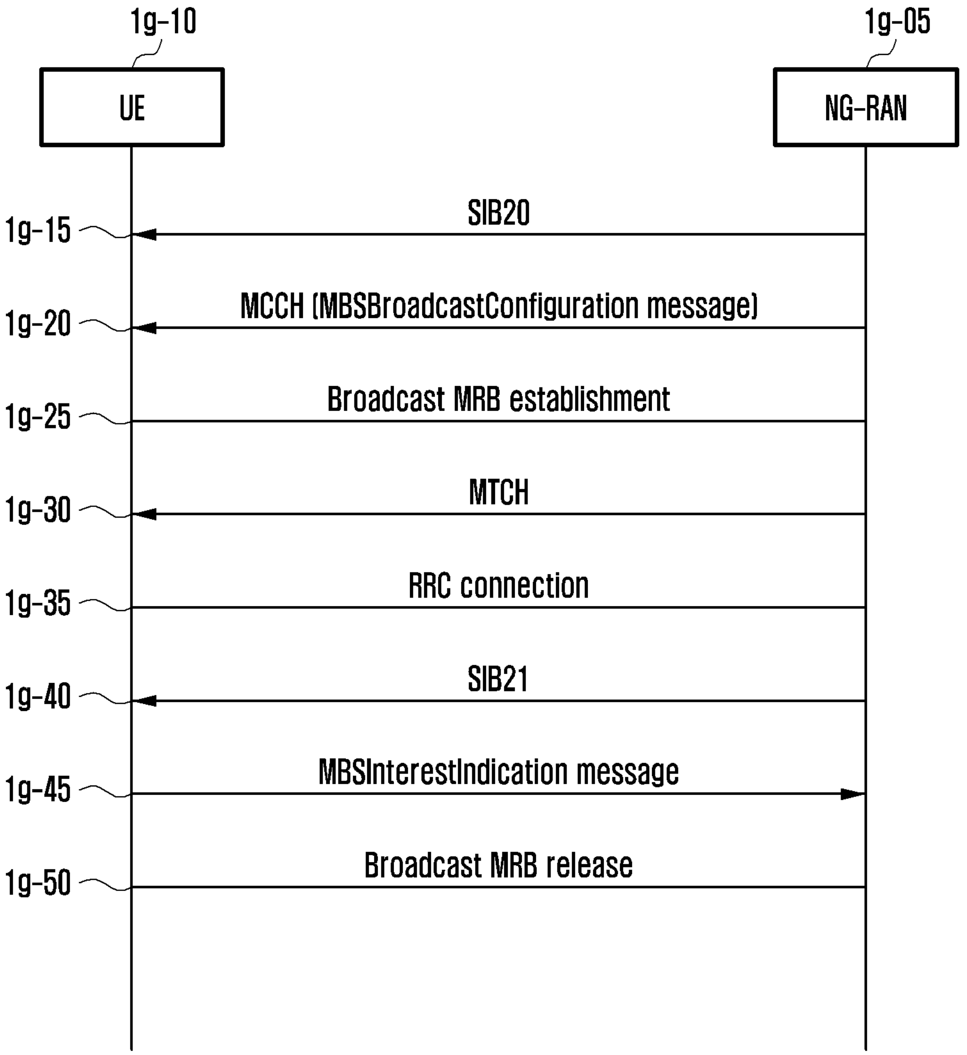
FIG. 7 is an embodiment illustrating a transmission/reception procedure performed between a base station and a user equipment (UE) to support multimedia broadcast service (MBS) broadcasting in an NR according to an embodiment of the disclosure.

FIG. 7 is an embodiment illustrating a transmission/reception procedure performed between a base station and a UE to support MBS broadcasting in an NR according to an embodiment of the disclosure.

Referring to FIG. 7, a UE 1*g*-10 in RRC idle mode (RRC_IDLE) or RRC inactive mode (RRC_INACTIVE) may camp on a cell or base station 1*g*-05 providing SIB 20 to receive the SIB 20 in operation 1*g*-15. A connected mode (RRC_CONNECTED) UE may also receive the SIB 20. The SIB 20 may include information necessary for a UE to obtain MBS control channel (MCCH) information necessary for MBS (multicast/broadcast service) broadcast reception. Here, the meaning of MCCH is as follows: A point-to-multipoint downlink channel used for transmitting MBS broadcast control information associated to one or several MTCH(s) from the network to the UE.

The ASN.1 format of SIBx may be as shown in Table 6.

TABLE 6

| SIB20 |
|---|
| SIB20 contains the information required to acquire the MCCH configuration for MBS broadcast. |
| SIB20 information element |

```
-- ASN1START
-- TAG-SIB20-START
SIB20-r17 ::=   SEQUENCE {
   mcch-Config-r17   MCCH-Config-r17,
   cfr-ConfigMCCH-MTCH-r17   CFR-ConfigMCCH-MTCH-r17 OPTIONAL,
```

TABLE 6-continued

```
-- Need S
   lateNonCriticalExtension   OCTET STRING   OPTIONAL,
   ...
}
MCCH-Config-r17 ::= SEQUENCE {
   mcch-RepetitionPeriodAndOffset-r17   MCCH-RepetitionPeriodAndOffset-r17,
   mcch-WindowStartSlot-r17   INTEGER (0 .. 79),
   mcch-WindowDuration-r17   ENUMERATED {sl2, sl4, sl8, sl10, sl20,
sl40,sl80, sl160}   OPTIONAL, -- Need S
   mcch-ModificationPeriod-r17   ENUMERATED {rf2, rf4, rf8, rf16, rf32,
rf64, rf128, rf256,
      rf512, rf1024, r2048, rf4096, rf8192, rf16384, rf32768,
rf65536}
}
MCCH-RepetitionPeriodAndOffset-r17 ::= CHOICE {
   rf1-r17   INTEGER(0),
   rf2-r17   INTEGER(0..1),
   rf4-r17   INTEGER(0..3),
   rf8-r17   INTEGER(0..7),
   rf16-r17   INTEGER(0..15),
   rf32-r17   INTEGER(0..31),
   rf64-r17   INTEGER(0..63),
   rf128-r17   INTEGER(0..127),
   rf256-r17   INTEGER(0..255)
}
-- TAG-SIB20-STOP
-- ASN1STOP
```

| SIB20 field descriptions |
|---|
| cfr-ConfigMCCH-MTCH<br>Common frequency resource used for MCCH and MTCH reception. If the field is absent, the CFR for broadcast has the same location and size as CORESET0 and PDSCH configuration of MCCH is the same as PDSCH configuration provided in initialDownlinkBWP in SIB1. |
| mcch-WindowDuration<br>Indicates, starting from the slot indicated by mcch-WindowStartSlot, the duration in slot during which MCCH may be scheduled. Absence of this field means that MCCH is only scheduled in the slot indicated by mcch-WindowStartSlot. |
| mcch-ModificationPeriod<br>Defines periodically appearing boundaries, i.e., radio frames for which SFN mod mcch-ModificationPeriod = 0. The contents of different transmissions of MCCH information can only be different if there is at least one such boundary in-between them. Value rf2 corresponds to two radio frames, value rf4 corresponds to four radio frames and so on. |
| mcch-Repetition PeriodAndOffset<br>Defines the length and the offset of the MCCH repetition period. rf1 corresponds to a repetition period length of one radio frame, rf2 corresponds to a repetition period length of two radio frames and so on. The corresponding integer value indicates the offset of the repetition period in the number of radio frames. MCCH is scheduled in radio frames for which: SFN mod repetition period length = offset of the repetition period. |
| mcch-WindowStartSlot<br>Indicates the slot in which MCCH transmission window starts. |

In operation 1*g*-20, when the UE 1*g*-10 supporting MBS wants to receive MBS broadcasting (or the UE is interested in MBS broadcasting) or the UE is receiving the MBS broadcasting service, the UE may obtain an MBSBroadcast-Configuration message on MCCH after entering the cell providing the SIB 20 or receiving an update notification of MCCH information. Specifically, the above contents may be described as the procedure in Table 7 below.

TABLE 7

An MBS capable UE interested to receive or receiving an MBS broadcast service shall:

1>if the procedure is triggered by an MCCH information change notification:

2>start acquiring the MBSBroadcastConfiguration message on MCCH from the slot in which the change notification was received;

1>if the UE enters a cell broadcasting SIB20; or

1>if the UE receives sCellSIB20:

2>acquire the MBSBroadcastConfiguration message on MCCH in the concerned cell at the next repetition period.

For reference, a specific procedure for updating MCCG information may be as shown in Table 8 below.

TABLE 8

| |
|---|
| Change of MCCH information only occurs at specific radio frames, i.e., the concept of a modification period is used. Within a modification period, the same MCCH information may be transmitted a number of times, as defined by its scheduling (which is based on a repetition period). |
| When the network changes (some of) the MCCH information, it notifies the UEs about the change starting from the beginning of the MCCH modification period via PDCCH which schedules the MCCH in every repetition in that modification period. |
| Upon receiving a change notification, a UE receiving or interested to receive MBS services transmitted using MBS broadcast acquires the new MCCH information starting from the same slot. The UE applies the previously acquired MCCH information until the UE acquires the new MCCH information. The notification is transmitted with a 2-bit bitmap, see TS 38.212 [17] clause 7.3.1.5.1. The MSB in the 2-bit bitmap, when set to '1', indicates the start of new MBS service(s). The LSB in the 2-bit bitmap, when set to '1', indicates modification of MCCH information other than the change caused by start of new MBS service(s), e.g., modification of a configuration of an on-going MBS session(s), MBS session(s) stop or neighbouring cell information modification. |

The ASN.1 format of the MBSBroadcastConfiguration message may be as shown in Table 9.

TABLE 9

MBSBroadcastConfiguration message

```
-- ASN1START
-- TAG-MBSBROADCASTCONFIGURATION-START
MBSBroadcastConfiguration-r17 ::= SEQUENCE {
  criticalExtensions                  CHOICE {
    mbsBroadcastConfiguration-r17    MBSBroadcastConfiguration-r17-IEs,
    criticalExtensionsFuture          SEQUENCE { }
  }
}
MBSBroadcastConfiguration-r17-IEs ::= SEQUENCE {
  mbs-SessionInfoList-r17              MBS-SessionInfoList-r17
OPTIONAL, -- Need R
  mbs-NeighbourCellList-r17             MBS-NeighbourCellList-r17
OPTIONAL, -- Need S
  drx-ConfigPTM-List-r17               SEQUENCE (SIZE (1..maxNrofDRX-
ConfigPTM-r17)) OF DRX-ConfigPTM-r17 OPTIONAL, -- Need R
  pdsch-ConfigMTCH-r17                 PDSCH-ConfigBroadcast-r17
OPTIONAL, -- Need S
  mtch-SSB-MappingWindowList-r17    MTCH-SSB-MappingWindowList-r17
OPTIONAL, -- Need R
  lateNonCriticalExtension             OCTET STRING
OPTIONAL,
  nonCriticalExtension                 SEQUENCE { }
OPTIONAL
}
-- TAG-MBSBROADCASTCONFIGURATION-STOP
-- ASN1STOP
```

MBSBroadcastConfiguration field descriptions pdsch-ConfigMTCH
Provides parameters for acquiring the PDSCH for MTCH. When this field is absent, the UE shall use parameters in pdsch-ConfigMCCH to acquire the PDSCH for MTCH.

mbs-SessionInfoList
Provides the configuration of each MBS session provided by MBS broadcast in the current cell.

mbs-NeighbourCellList
List of neighbour cells providing MBS broadcast services via broadcast MRB. This field is used by the UE together with mtch-NeighbourCell field signalled for each MBS session in the corresponding MBS-SessionInfo. When an empty mbs-NeighbourCellList list is signalled, the UE shall assume that MBS broadcast services signalled in mbs-SessionInfoList in the MBSBroadcastConfiguration message are not provided in any neighbour cell. When the field mbs-NeighbourCellList is absent, the current serving cell does not provide information about MBS broadcast services in the neighbouring cells, i.e., the UE cannot determine the presence or absence of an MBS service in neighbouring cells based on the absence of this field.

The mbs-sessionInfoList parameter shown above may include information on a plurality of MBS sessions currently being serviced in the cell, and the ASN.1 format of the parameter may be as shown in Table 10.

TABLE 10

```
MBS-SessionInfoList-r17 ::=  SEQUENCE (SIZE (1..maxNrofMBS-Session-
r17)) OF MBS-SessionInfo-r17
MBS-SessionInfo-r17 ::=          SEQUENCE {
  mbs-SessionId-r17               TMGI-r17,
  g-RNTI-r17                  RNTI-Value,
  mrb-ListBroadcast-r17             MRB-ListBroadcast-r17,
  mtch-SchedulingInfo-r17             DRX-ConfigPTM-Index-r17
OPTIONAL, -- Need S
  mtch-NeighbourCell-r17              BIT STRING (SIZE(maxNeighCellMBS-r17))
OPTIONAL, -- Need S
  pdsch-ConfigIndex-r17             PDSCH-ConfigIndex-r17
OPTIONAL, -- Need S
  mtch-SSB-MappingWindowIndex-r17 MTCH-SSB-MappingWindowIndex-r17
OPTIONAL -- Need R
}
```

Each MBS session may be distinguished by an MBS session ID (the mbs-SessionId) called a temporary mobile group identity (TMGI), and the TMGI may be including a public land mobile network (PLMN) ID of an operator and a service ID distinguished within the PLMN. The g-RNTI (group-RNTI) may refer to a radio network temporary identifier (RNTI) that scrambles MTCH transmission and scheduling information.

In operation 1g-25, the UE 1g-10 may perform broadcast MBS radio bearer (MRB) establishment in order to receive the MBS broadcast session of interest. The performance may be initiated for the following reasons: Upon start of the MBS session, upon entering a cell providing a MBS broadcast service UE is interested in, upon becoming interested in the MBS broadcast service, upon removal of UE capability limitations inhibiting reception of the MBS broadcast service UE is interested in.

The specific procedure of operation 1g-25 may be as shown in Table 11.

TABLE 11

Upon a broadcast MRB establishment, the UE shall:
- 1>establish a PDCP entity and an RLC entity in accordance with MRB-InfoBroadcast for this broadcast MRB included in the MBSBroadcastConfiguration message and the configuration specified in 9.1.1.7;
- 1>configure the MAC layer in accordance with the mtch-SchedulingInfo (if included);
- 1>configure the physical layer in accordance with the mbs-SessionInfoList, searchSpaceMTCH, pdsch-ConfigMTCH, applicable for the broadcast MRB, as included in the MBSBroadcastConfiguration message;
- 1>receive DL-SCH on the cell where the MBSBroadcastConfiguration message was received for the established MBS broadcast service using g-RNTI and mtch-SchedulingInfo (if included) in this message for this MBS broadcast service;
- 1>if an SDAP entity with the received tmgi does not exist:
  - 2>establish an SDAP entity as specified in TS 37.324 [24] clause 5.1.1.
  - 2>indicate the establishment of the user plane resources for the tmgi to upper layers.

In operation 1g-30, the UE 1g-10 receives MBS broadcast data through an MBS traffic channel (MTCH). The MTCH refers to: A point-to-multipoint downlink channel for transmitting MBS data of either multicast session or broadcast session from the network to the UE.

To receive the MTCH, the UE 1g-10 may decode a physical downlink control channel (PDCCH) scrambled with g-RNTI (Group RNTI). The g-RNTI required for the PDCCH decode may be provided in the form of a list of a plurality of g-RNTIs, one for each MBS broadcasting session (i.e., per mbs-SessionId, or per temporary mobile group identity (TMGI)), through the MBS-SessionInfoList IE in the MBSBroadcastConfiguration message.

In operation 1g-35, the UE 1g-10 may configure an RRC connection with the base station 1g-05 and transition to the connected mode. Alternatively, the UE 1g-10 may already be in the connected mode without the process of operation 1g-35.

In operation 1g-40, the UE 1g-10 may receive SIB 21. The SIB 21 may include mapping of frequencies and MBS services, and the ASN.1 format may be as shown in Table 12.

TABLE 12

SIB21 information element

```
-- ASN1START
-- TAG-SIB21-START
SIB21-r17 ::= SEQUENCE {
   mbs-FSAI-IntraFreq-r17   MBS-FSAI-List-r17   OPTIONAL,
-- Need R
   mbs-FSAI-InterFreqList-r17   MBS-FSAI-InterFreqList-r17
OPTIONAL, -- Need R
   lateNonCriticalExtension   OCTET STRING   OPTIONAL,
   ...
}
MBS-FSAI-List-r17 ::= SEQUENCE (SIZE (1..maxFSAI-MBS-r17)) OF MBS-
FSAI-r17
MBS-FSAI-InterFreqList-r17 ::= SEQUENCE (SIZE (1..maxFreq)) OF MBS-
FSAI-InterFreq-r17
MBS-FSAI-InterFreq-r17 ::= SEQUENCE {
   dl-CarrierFreq-r17   ARFCN-ValueNR,
   mbs-FSAI-List-r17   MBS-FSAI-List-r17
}
MBS-FSAI-r17 ::= OCTET STRING (SIZE (3))
-- TAG-SIB21-STOP
-- ASN1STOP
```

SIB21 field descriptions mbs-FSAI-InterFreqList
Contains a list of neighboring frequencies including additional bands, if any, that provide MBS services and the corresponding MBS FSAIs.
mbs-FSAI-IntraFreq
Contains the list of MBS FSAIs for the current frequency. For MBS service continuity, the UE shall use all MBS FSAIs listed in mbs-FSAI-IntraFreq to derive the MBS frequencies of interest.

The presence of SIB 21 implicitly enables reporting of the MBSInterestIndication message shown below. The absence of SIB 21 implicitly disables reporting of the MBSInterestIndication message shown below. The order of operations 1g-35 and 1g-40 may be reversed.

In operation 1g-45, the UE 1g-10 in the connection mode supporting MBS may transmit an MBSInterestIndication message to inform the base station 1g-05 of the MBS broadcasting service that the UE 1g-10 is receiving or is interested in and a related frequency. In addition, the MBSInterestIndication message may be transmitted to transmit priority information of MBS broadcasting versus unicast. The ASN.1 format of the MBSInterestIndication message may be as shown in Table 13.

TABLE 13

MBSInterestIndication

The MBSInterestIndication message is used to inform network that the UE is receiving/interested to receive or no longer receiving/ interested to receive MBS broadcast service(s) via a broadcast MRB.
   Signalling radio bearer: SRB1
   RLC-SAP: AM
   Logical channel: DCCH
   Direction: UE to Network MBSInterestIndication message

```
-- ASN1START
-- TAG-MBSINTERESTINDICATION-START
MBSInterestIndication-r17 ::= SEQUENCE {
   criticalExtensions   CHOICE {
      mbsInterestIndication-r17   MBSInterestIndication-r17-IEs,
      criticalExtensionsFuture   SEQUENCE { }
   }
}
MBSInterestIndication-r17-IEs ::= SEQUENCE {
mbs-FreqList-r17   CarrierFreqListMBS-r17   OPTIONAL,
mbs-Priority-r17   ENUMERATED {true}   OPTIONAL,
mbs-ServiceList-r17   MBS-ServiceList-r17   OPTIONAL,
lateNonCriticalExtension   OCTET STRING   OPTIONAL,
nonCriticalExtension   SEQUENCE { }   OPTIONAL
}
```

TABLE 13-continued

```
-- TAG-MBSINTERESTINDICATION-STOP
-- ASN1STOP
```

| MBSInterestIndication field descriptions |
|---|
| mbs-FreqList<br>List of MBS frequencies on which the UE is receiving or interested to receive MBS broadcast service via a broadcast MRB. |
| mbs-Priority<br>Indicates whether the UE prioritises MBS broadcast reception above unicast and MBS multicast reception. The field is present (i.e., value true), if the UE prioritises reception of broadcast services, on frequencies indicated in mbs-FreqList, above a reception of any of the unicast bearers and multicast MRBs. Otherwise the field is absent. |
| mbs-ServiceList<br>List of MBS broadcast services which the UE is receiving or interested to receive. |

Figure 15:
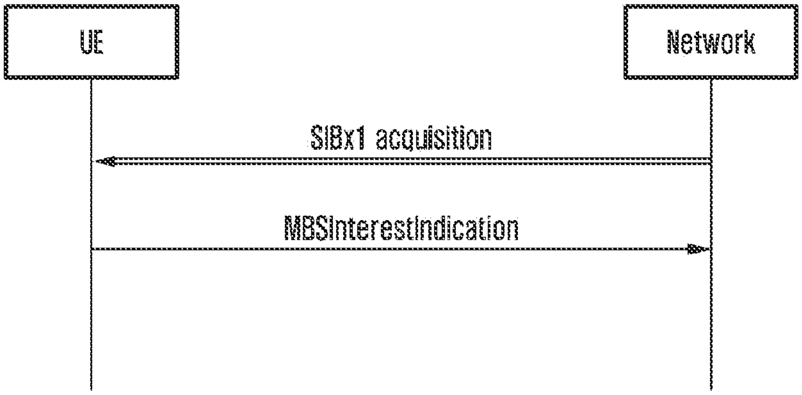
FIG. 15 is a diagram illustrating a part of a procedure of a configuration and transmission of an MBSInterestIndication message.

FIG. 15 is a diagram illustrating a part of a procedure of a configuration and transmission of an MBSInterestIndication message.

Referring to FIG. 15, it illustrates the part of the procedure of the configuration and transmission of the MBSInterestIndication message, where the procedure is further described in Table 14 below.

TABLE 14

5.9.4.1 General

The purpose of this procedure is to inform the network that the UE in RRC_CONNECTED state is receiving or is interested to receive MBS broadcast service(s) and to inform the network about the priority of MBS broadcast versus unicast and multicast MRB reception. MBS Interest Indication can only be sent after AS security activation.

5.9.4.2 Initiation

An MBS capable UE in RRC_CONNECTED may initiate the procedure in several cases including upon successful connection establishment/resume, upon entering or leaving the broadcast service area, upon MBS broadcast session start or stop, upon change of interest, upon change of priority between MBS broadcast reception and unicast/multicast reception, upon change to a PCell broadcasting SIB21, upon receiving SIB20 of an SCell via dedicated signalling, upon handover.

Upon initiating the procedure, the UE shall:

- 1>if SIB21 is provided by the PCell:
  - 2>ensure having a valid version of SIB21 for the PCell;
  - 2>if the UE did not transmit MBS Interest Indication since last entering RRC_CONNECTED state; or
  - 2>if since the last time the UE transmitted an MBS Interest Indication, the UE connected to a PCell not broadcasting SIB21:
    - 3>if the set of MBS broadcast frequencies of interest, determined in accordance with 5.9.4.3, is not empty:
      - 4>set the contents of MBS Interest Indication according to 5.9.4.5 and initiate transmission of the MBSInterestIndication message;
  - 2>else:
    - 3>if the set of MBS broadcast frequencies of interest, determined in accordance with 5.9.4.3, is different from mbs-FreqList included in the last transmission of the MBS Interest Indication; or
    - 3>if the prioritisation of reception of all indicated MBS broadcast frequencies compared to reception of any of the established unicast bearers and multicast MRBs has changed since the last transmission of the MBS Interest Indication:
      - 4>set the contents of MBS Interest Indication according to 5.9.4.5 and initiate transmission of the MBSInterestIndication message;

NOTE: The UE may send MBS Interest Indication even when it is able to receive the MBS services it is interested in i.e., to avoid that the network allocates a configuration inhibiting MBS broadcast reception.

- 3>else if SIB20 is provided for the PCell or for the SCell:
  - 4>if since the last time the UE transmitted the MBS Interest Indication, the UE connected to a PCell not providing SIB20 and the UE was not provided with SIB20 for an SCell; or
  - 4>if the set of MBS broadcast services of interest determined in accordance with 5.9.4.4 is different from mbs-ServiceList included in the last transmission of the MBS Interest Indication:
    - 5>set the contents of MBS Interest Indication according to 5.9.4.5 and initiate the transmission of MBSInterestIndication message.

TABLE 14-continued

| |
|---|
| 5.9.4.3 MBS frequencies of interest determination |
| The UE shall: |
| 1>consider a frequency to be part of the MBS frequencies of interest if the following conditions are met: |
| 2>at least one MBS session the UE is receiving or interested to receive via a broadcast MRB is ongoing or about to start; and |
| NOTE 1: The UE may determine whether the session is ongoing from the start and stop time indicated in the User Service Description (USD), see TS 38.300 [2] or TS 23.247 [67]. |
| 2>for at least one of these MBS sessions, SIB21 acquired from the PCell includes mapping between the concerned frequency and one or more MBS FSAIs indicated in the USD for this session, or for at least one of these MBS sessions, the concerned frequency is not included in SIB21 but is indicated in the USD for this session; and |
| NOTE 2: The UE considers a frequency to be part of the MBS frequencies of interest even though NG-RAN may (temporarily) not employ a broadcast MRB for the concerned session, i.e., the UE does not verify if the session is indicated on MCCH. |
| 2>the supportedBandCombination the UE included in UE-NR-Capability contains at least one band combination including the concerned MBS frequency of interest. |
| NOTE 3: When evaluating which frequencies the UE is capable of receiving, the UE does not take into account whether they are currently configured as serving frequencies. |
| 5.9.4.4 MBS services of interest determination |
| The UE shall: |
| 1>consider an MBS service to be part of the MBS services of interest if the following conditions are met: |
| 2>the UE is receiving or interested to receive this service via a broadcast MRB; and |
| 2>the session of this service is ongoing or about to start; and |
| 2>one or more MBS FSAIs in the USD for this service is included in SIB21 acquired from the PCell for a frequency belonging to the set of MBS frequencies of interest, determined according to 5.9.4.3. |
| NOTE: The UE may determine whether the session is ongoing from the start and stop time indicated in the User Service Description (USD), see TS 38.300 [2] or TS 23.247 [67]. |
| 5.9.4.5 Setting of the contents of MBS Interest Indication |
| The UE shall set the contents of the MBS Interest Indication as follows: |
| 1>if the set of MBS frequencies of interest, determined in accordance with 5.9.4.3, is not empty: |
| 2>include mbs-FreqList and set it to include the MBS frequencies of interest sorted by decreasing order of interest, using the absoluteFrequencySSB for serving frequency, if applicable, and the ARFCN-ValueNR(s) as included in SIB21 or in USD (for neighbouring frequencies); |
| 2>include mbs-Priority if the UE prioritises reception of all indicated MBS frequencies above reception of any of the unicast bearers and multicast MRBs; |
| NOTE: If the UE prioritises MBS broadcast reception and unicast/multicast data cannot be supported because of congestion on the MBS carrier(s), NG-RAN may for example initiate release of unicast bearers/multicast MRBs. |
| 2>if SIB20 is provided for the PCell or for the SCell: |
| 3>include mbs-ServiceList and set it to indicate the set of MBS services of interest sorted by decreasing order of interest determined in accordance with 5.9.4.4. |

In operation 1g-50, the UE 1g-10 may perform broadcast MRB release to stop receiving the MBS broadcast. Alternatively, the broadcast MRB release may be performed in the following cases:

Upon stop of the MBS session, upon leaving the cell broadcasting the MBS service UE is interested in, upon losing interest in the MBS service, when capability limitations start inhibiting reception of the concerned service. Specifically, the broadcast MBS release procedure may be as shown in Table 15.

TABLE 15

| |
|---|
| Upon broadcast MRB release for MBS broadcast service, the UE shall: |
| 1>release the PDCP entity, RLC entity as well as the related MAC and physical layer configuration; |
| 1>if the SDAP entity associated with the corresponding tmgi has no associated MRB: |
| 2>release the SDAP entity, as specified in TS 37.324 [24] clause 5.1.2; |
| 2>indicate the release of the user plane resources for the tmgi to upper layers. |

Figure 8:
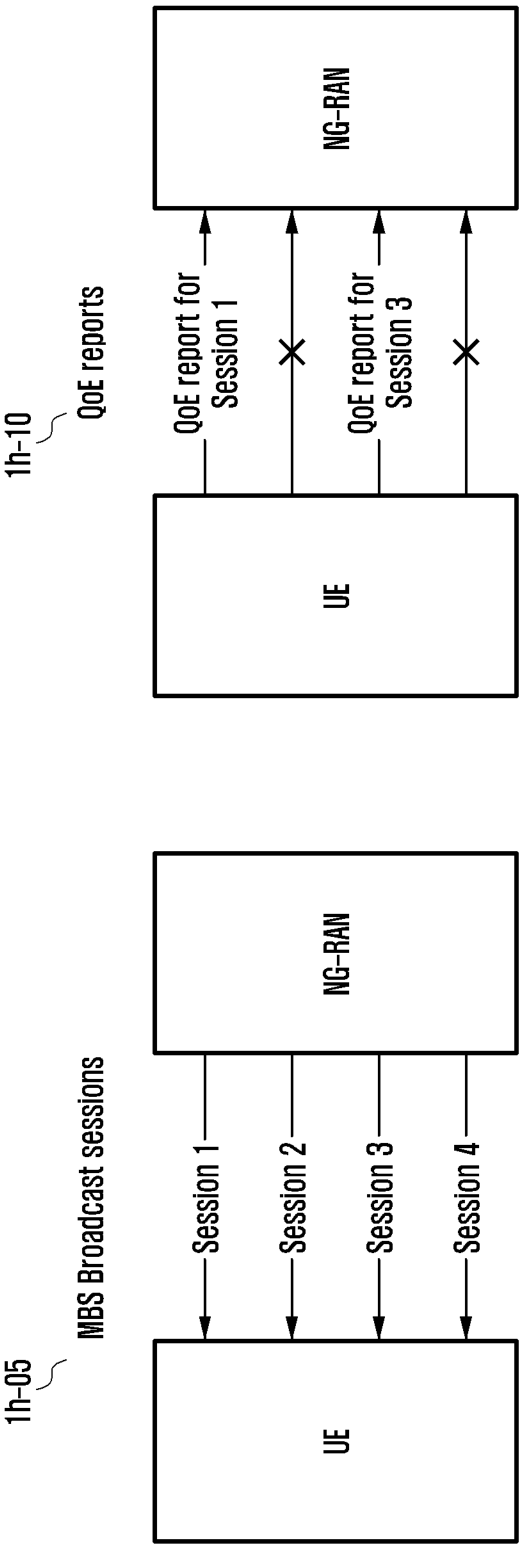
FIG. 8 is a diagram illustrating an idea of activating or deactivating QoE measurement or reporting for each MBS session according to an embodiment of the disclosure.

FIG. 8 is a diagram illustrating an idea of activating or deactivating QoE measurement or reporting for each MBS session according to an embodiment of the disclosure.

Referring to FIG. 8, the OAM or the base station may configure the QoE measurement of the UE for the MBS service. However, a plurality of MBS (broadcast) sessions may coexist in the base station or cell. In this case, the OAM or the base station may want to support the QoE measurement only for a specific session. For example, in operation **1*h*-05, the base station provides services for a total of 4 MBS sessions. However, from the viewpoint of the UE, performing QoE measurement for all MBS sessions and generating and transmitting a QoE measurement result report may be burdensome in terms of resource and energy consumption. In addition, from the viewpoint of the OAM or the base station, receiving and processing QoE reports for all MBS sessions from the UE may be burdensome in terms of computing/processing and resource management. Moreover, from the viewpoint of the OAM or the base station, there may be MBS sessions (e.g., session 1 and session 3 in FIG. 8) that want to improve the quality of service by receiving reports on QoE measurement results (through network optimization), while there may be MBS session (e.g., session 2 and session 4 in FIG. 8**) that do not want to receive the QoE reports. For example, the base station may want to enable QoE measurement and reporting of the UE for an MBS session in which high quality of service is required or many users are receiving service, and may want to disable QoE measurement and reporting of the UE for an MBS session with low service requirements or a small number of UEs receiving the service.

Accordingly, in operation **1*h*-10, the OAM or the base station may activate QoE measurement or reporting only for sessions 1 and 3, and deactivate QoE measurement or reporting for sessions 2 and 4**.

In order to implement the above idea, the UE may report to the base station whether the QoE measurement for each MBS session is supported. The indicator may be defined in the UECapability message and reported to the base station.

In order to implement the above idea, an indicator indicating whether to activate QoE measurement (or application layer measurement) for each MBS session may be added through MBSBroadcastConfiguration, a system information message, or other newly defined broadcast messages. When the indicator is defined in the MBSBroadcastConfiguration message, the indicator (e.g., appLayerSupport) may be included as shown in Table 16 for each MBS-SessionInfo in the MBSBroadcastConfiguration message.

TABLE 16

```
MBS-SessionInfoList-r17 ::=          SEQUENCE (SIZE (0..maxNrofMBS-Session-
r17)) OF MBS-SessionInfo-r17
MBS-SessionInfo-r17 ::=             SEQUENCE {
   mbs-SessionId-r17               TMGI-r17,
   g-RNTI-r17                     RNTI-Value,
      appLayerSupport                     BOOLEAN,
                                         OPTIONAL,
   mrb-ListBroadcast-r17              MRB-ListBroadcast-r17
OPTIONAL,
   mtch-SchedulingInfo-r17             DRX-ConfigPTM-Index-r17
OPTIONAL, -- NEED S
   mtch-NeighbourCell-r17              BIT STRING (SIZE(maxNeighCell-MBS-r17))
OPTIONAL, -- NEED R
   pdsch-ConfigIndex-r17           PDSCH-ConfigIndex-r17
OPTIONAL, -- NEED S
   mtch-SSB-MappingWindowIndex-r17    MTCH-SSB-MappingWindowIndex-
r17   OPTIONAL -- NEED R
}
```

In this case, TMGI or g-RNTI (e.g., within the same MBS SessionInfo) delivered together with the indicator may be used to indicate specific MBS session(s), and activate or deactivate QoE measurement or reporting for the corresponding MBS session(s) through the indicator. As an example, the indicator may be defined as "ENUMERATED {enabled, disabled}". The indicator may be included as an optional IE. In this case, a base station supporting QoE measurement (or a base station supporting QoE measurement for MBS, or a base station supporting QoE measurement per session) may include the indicator, and configure the indicator to true or enable for a session in which QoE measurement is to be activated, or to false or disable in a session in which QoE measurement is to be deactivated. A base station that does not support QoE measurement (or a base station that does not support QoE measurement for MBS, or a base station that does not support QoE measurement per session) may not include the indicator. Of course, the indicator may also be defined as "ENUMERATED {enabled}".

A radio resource control (RRC) layer or an access stratum (AS) layer of the UE receiving the indicator may deliver the indicator to the APP layer (Option 1). The UE may transmit a corresponding TMGI value to a higher layer (or APP layer) after the broadcast MRB is established, and in this case, the indicator (e.g., appLayerSupport) may be transmitted together or separately. The procedure related to this may be as shown in Table 17 below.

TABLE 17

| |
|---|
| Upon a broadcast MRB establishment, the UE shall:<br>1>establish a PDCP entity and an RLC entity in accordance with MRB-InfoBroadcast for this broadcast MRB included in the MBSBroadcastConfiguration message and the configuration specified in 9.1.1.7;<br>1>configure the MAC layer in accordance with the mtch-SchedulingInfo (if included);<br>1>configure the physical layer in accordance with the mbs-SessionInfoList, searchSpaceMTCH, pdsch-ConfigMTCH, applicable for the broadcast MRB, as included in the MBSBroadcastConfiguration message;<br>1>receive DL-SCH on the cell where the MBSBroadcastConfiguration message was received for the established MBS broadcast service using g-RNTI and mtch-SchedulingInfo (if included) in this message for this MBS broadcast service;<br>1>inform upper layers about the establishment of the broadcast MRB by indicating the corresponding tmgi and appLayerSupport;<br>1>if an SDAP entity with the received tmgi does not exist:<br>2>establish an SDAP entity as specified in TS 37.324 [24] clause 5.1.1.<br>2>indicate the establishment of the user plane resources for the tmgi to upper layers. |

Alternatively, the indicator may be delivered to the APP layer together with the corresponding g-RNTI value instead of TMGI. The RRC layer may define or use an existing or new AT-command to deliver the indicator or TMGI or g-RNTI to the APP layer. The APP layer of the UE receiving the indicator may apply and use the indicator to the MBS session(s) corresponding to the TMGI (or g-RNTI) received together. If the indicator is configured to true or enable or presented, the APP layer of the UE may perform QoE measurement only for the MBS session(s) for which the indicator is configured and generate a QoE measurement report. As another embodiment of the disclosure, the UE APP layer may always perform QoE measurement for all MBS sessions and generate a QoE measurement report, but may deliver the QoE measurement report to the AS layer only for the MBS session(s) to which the indicator is applied. As another embodiment of the disclosure, the UE APP layer may always perform QoE measurement for all MBS sessions, but generate a QoE measurement report only for the MBS session(s) to which the indicator is applied and deliver the same to the AS layer. Conversely, if the indicator is configured to false or disable or is absent, the UE APP layer may not perform QoE measurement and generate a QoE measurement report for the MBS session(s) to which the indicator is applied. As another embodiment of the disclosure, the UE APP layer may always perform QoE measurement for all MBS sessions and generate a QoE measurement report, but may not deliver the QoE measurement report to the AS layer only for the MBS session(s) to which the indicator is applied. As another embodiment of the disclosure, the UE APP layer may always perform QoE measurement for all MBS sessions, but may not generate a QoE measurement report only for MBS session(s) to which the indicator is applied.

As another embodiment of the disclosure, the UE AS layer may filter the QoE measurement result report received from the APP layer based on the indicator without delivering the indicator to the APP layer (Option 2). For example, when receiving the QoE measurement result report of the APP layer, the AS layer of the UE may determine which MBS session generated the report. To this end, the UE AS layer may receive TMGI or g-RNTI indicating specific MBS session(s) together with the QoE measurement result report from the APP layer. If the indicator (e.g., appLayerSupport) received from the base station by the UE AS layer is configured to true or enable or presented, the UE AS layer may deliver only the QoE measurement report generated by the corresponding MBS session (received from the APP layer) to the base station. If the indicator (e.g., appLayer-Support) received from the base station by the UE AS layer is configured to false or disable or is absent, even if receiving the QoE measurement report generated by the corresponding MBS session from the APP layer, the UE AS layer may not forward the QoE measurement report to the base station or discard the same.

As another embodiment of the disclosure, the indicator regarding whether to measure QoE for each MBS session may be used for a broadcast message as well as a dedicated message (transmitted for each UE). When used in the broadcast message as in the above method, the indicator may be commonly applied to all UEs for each MBS session, but when using the dedicated message, it is possible to configure differently for each MBS session and also for each UE. For example, the OAM or base station may configure QoE measurement or reporting for MBS session 1 and MBS session 3 for UE 1 and QoE measurement or report for MBS session 2 and MBS session 3 for UE 2 simultaneously. QoE configuration information may be included in an RRCReconfiguration message or an RRCResume message (i.e., a dedicated message) with the format of AppLayer-MeasConfig. Along with the QoE configuration information, an indicator regarding whether to measure QoE for each MBS session may be delivered as shown in Table 18 below.

TABLE 18

```
AppLayerMeasConfig-r17 ::=                    SEQUENCE {
  measConfigAppLayerToAddModList-r17  SEQUENCE (SIZE
(1..maxNrofAppLayerMeas-r17)) OF MeasConfigAppLayer-r17   OPTIONAL, --
Need N
  measConfigAppLayerToReleaseList-r17 SEQUENCE (SIZE
(1..maxNrofAppLayerMeas-r17)) OF MeasConfigAppLayerId-r17 OPTIONAL, -
- Need N
  rrc-SegAllowed-r17                    ENUMERATED {enabled}
```

TABLE 18-continued

```
OPTIONAL, -- Need R
  ...
}
MeasConfigAppLayer-r17 ::=                 SEQUENCE {
  measConfigAppLayerId-r17                   MeasConfigAppLayerId-r17,
  measConfigAppLayerContainer-r17              OCTET STRING (SIZE (1..8000))
OPTIONAL, -- Need N
  serviceType-r17                      ENUMERATED {streaming, mtsi, vr, MBS,
spare4, spare3, spare2, spare1}   OPTIONAL, -- Need M
  mbs-SessionList                    SEQUENCE (SIZE (1..maxNrofMBS-Session)) OF
TMGI-r17   OPTIONAL, -- Cond MBS
    pauseReporting                         BOOLEAN
OPTIONAL, -- Need M
  transmissionOfSessionStartStop               BOOLEAN
OPTIONAL, -- Need M
  ran-VisibleParameters-r17                SetupRelease {RAN-VisibleParameters-r17}
OPTIONAL, -- Need M
  ...
}
```

AppLayerMeasConfig may include a plurality of MeasConfigAppLayer (QoE configuration information). For each MeasConfigAppLayer, QoE configuration information ID (measConfigAppLayerId), APP layer QoE configuration information (measConfigAppLayerContainer), and service type (serviceType) of QoE configuration information may be included. As described above, MBS may be additionally defined in serviceType. Alternatively, MBS broadcast and MBS multicast may be separately defined as serviceType. When serviceType is configured to MBS or MBS broadcast, the base station supports QoE measurement, the base station supports QoE measurement for MBS, or the base station supports QoE measurement per MBS session, an indicator (e.g., mbs-SessionList) regarding whether to measure QoE for each MBS session may be included in MeasConfigAppLayer. The indicator may consist of a plurality of TMGIs or g-RNTIs to indicate a plurality of MBS sessions requiring QoE measurement. The UE may perform QoE measurement or reporting on MBS sessions included in the corresponding list. Conversely, the UE may not perform QoE measurement or reporting on MBS sessions not included in the corresponding list. In this case, the method of option 1 or option 2 may be used. When the serviceType is not MBS or MBS broadcast, the base station does not support QoE measurement, the base station does not support QoE measurement for MBS, or the base station does not support QoE measurement per session, the corresponding indicator may be absent.

MBS QoE configuration information for RRC_INACTIVE or RRC_IDLE UE may be included in a dedicated RRC message (e.g., RRCRelease, a newly defined message) and transmitted, and in this case, the indicator may be included. The UE AS layer receiving the indicator may deliver the indicator to the APP layer as in option 1 above, and the APP layer may activate/deactivate QoE measurement or reporting for each MBS session. Alternatively, similar to option 2 above, the UE AS layer itself may filter the measurement report for each MBS session and forwards the same to the base station or not (may discard the measurement report).

As another embodiment of the disclosure, the OAM may include the indicator (e.g., mbs-SessionList) regarding whether to measure QoE for each MBS session in APP layer QoE configuration information (e.g., measConfigAppLayerContainer) and transmit the same to the UE. For example, the indicator may be included when the OAM generates APP layer QoE configuration information for MBS service. For example, when the OAM knows the MBS session ID (TMGI or g-RNTI) (e.g., through communication with objects for MBS services, such as MB-SMF) and generates APP layer QoE configuration information for MBS, QoE measurement or reporting may be activated or deactivated for each MBS session ID. The UE APP layer receiving the APP layer QoE configuration information including the indicator may perform QoE measurement or generate a report only for an MBS session indicated to be active, and may not perform QoE measurement or generate or transmit a report for an MBS session indicated to be inactive.

When the QoE measurement result report is generated in the UE APP layer and transmitted to the UE AS layer, TMGI or g-RNTI may be delivered together for each QoE report to indicate which MBS session the report is for. In this case, a new AT-Command or that of the related art may be used. Upon receiving this (TMGI or g-RNTI), the UE AS layer may include the received TMGI or g-RNTI when transmitting the QoE measurement result report to the base station through a MeasurementReportAppLayer message.

The UE may include the TMGI or g-RNTI in MeasurementReportAppLayer-r17-IEs when some or all of the following conditions are satisfied:

- When the UE supports QoE measurement or reporting;
- When the UE supports QoE measurement or reporting for MBS;
- When the UE supports QoE measurement or reporting for each MBS session;
- When serviceType of MeasurementReportAppLayer-r17-IEs is MBS or MBS broadcast;
- When the base station supports QoE measurement or configuration for each MBS session;
- When the base station supports QoE measurement or configuration for MBS; and
- When the base station permits QoE measurement for each MBS session.

One MeasurementReportAppLayer-r17-IEs may include QoE measurement result reports for a plurality of MBS sessions, and accordingly, a plurality of MBS session IDs (TMGI or g-RNTI) may be defined or included.

The UE AS layer may report the QoE measurement result and the corresponding MBS session ID (s) (TMGI or g-RNTI) to the base station through the following message instead of the MeasurementReportAppLayer message:

- MB SInterestIndication;
- UEInformationResponse; and
- UEAssistanceInformation.

Unlike the above method (a method of specifying the MBS session ID (TMGI or g-RNTI) corresponding to each QoE measurement result report as an RRC parameter in the AS layer), the corresponding MBS session ID (TMGI or g-RNTI) may be defined and specified in the APP layer QoE measurement result report (e.g., measurementReportAppLayerContainer). The QoE measurement result report for a plurality of MBS sessions may be included in one APP layer QoE measurement result report (e.g., measurementReportAppLayerContainer), and accordingly, a plurality of MBS session IDs (TMGI or g-RNTI) may be defined or included.

QoE measurement of the related art was defined and used only for Unicast services (streaming, MTSI, VR). However, if MBS is introduced as a service type, an indicator for distinguishing whether QoE configuration (or reporting) for MBS multicast or QoE configuration (or reporting) for MBS broadcast may be introduced. When the serviceType is MBS, the base station may include the indicator (e.g., serviceCategory), and may indicate whether QoE configuration is for MBS multicast or MBS broadcast. When the serviceType is MBS and the indicator is absent, this may refer to QoE configuration for both MBS multicast and broadcast. Alternatively, it is defined as ENUMERATED {multicast, broadcast, both}, and "both" may indicate a QoE configuration commonly applied to both MBS multicast and broadcast. When the indicator is absent, it may refer to QoE measurement configuration for unicast service. Alternatively, as defined as ENUMERATED{unicast, multicast, broadcast}, unicast may be indicated for service types other than MBS, and in the case of MBS, multicast or broadcast may be indicated. The indicator may be delivered to the APP layer, and the APP layer may (or may not) perform QoE measurement for each cast based on this indicator, or may (or may not) generate a QoE measurement report. The QoE measurement report generated accordingly may also indicate the QoE measurement result for which cast as follows.

The QoE measurement result report generated by the UE APP layer may be transmitted to the AS layer and stored. The QoE measurement result report in connected mode, inactive mode, or idle mode may be stored in the AS layer. However, the memory size for storing the QoE measurement result report in the AS layer may be limited. When the memory of the UE is full, if the QoE measurement result report is additionally generated and delivered to the AS layer, the UE AS layer may discard the QoE measurement report of a partial or excessive size. To this end, the OAM, CN, or base station may configure a priority for storing the QoE measurement report together with the QoE configuration information. For example, whether to view the QoE measurement result report for the MBS service type as higher or lower priority than the QoE measurement result report for other service types may be indicated (e.g., mbsPriorityOverUnicast). The indicator may be included when the serviceType is MBS. When the indicator is absent, it may refer to that all service types have the same priority. Alternatively, a priority may be indicated for each QoE configuration (e.g., MeasConfigAppLayer) (e.g., priority). When the memory of the UE is full, the UE may discard reports generated for the QoE measurement configuration having low (lowest) priority.

Figure 9:
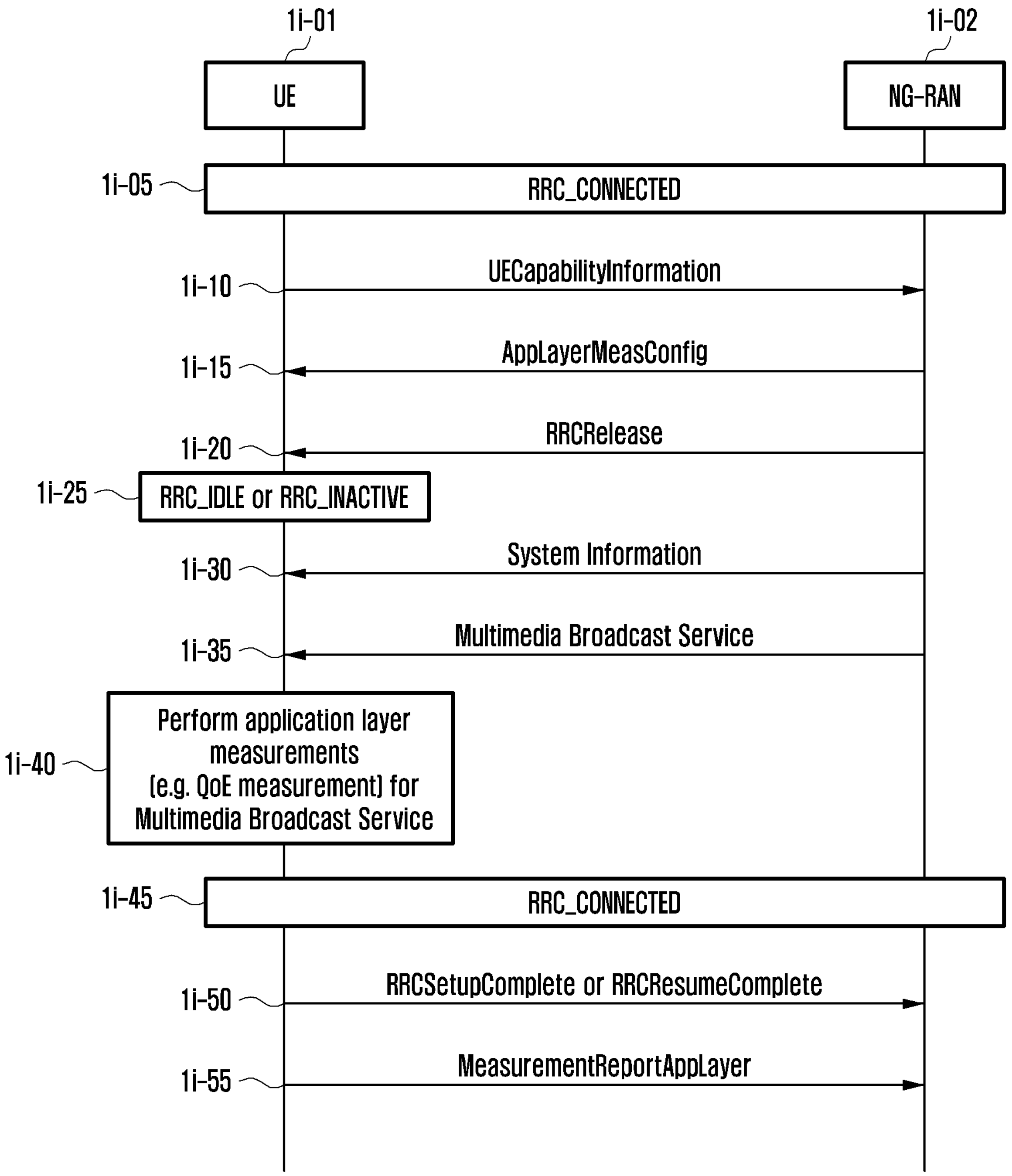
FIG. 9 is a diagram illustrating measurement and reporting of a UE for an MBS service according to an embodiment of the disclosure.

FIG. 9 is a diagram illustrating measurement and reporting of a UE for an MBS service according to an embodiment of the disclosure.

Referring to FIG. 9, a UE **1*i*-01 may be in an RRC connected mode (RRC_CONNECTED) by configuring an RRC connection with a base station 1*i*-02 in operation 1*i*-05**.

In operation **1*i*-10, the UE 1*i*-01 may transmit a UE capability information message (UECapabilityInformation) to the base station 1*i*-02**. Information included in the message may follow the above-described embodiments. As an example, the message may include information indicating that QoE measurement may be performed for multimedia broadcast services in an RRC idle mode (RRC_IDLE) or an RRC inactive mode (RRC_INACTIVE).

In operation **1*i*-15, the base station 1*i*-02 may transmit a predetermined RRC message (e.g., RRCResume or RRCReconfiguration) including configuration information (AppLayerMeasConfig) for application layer measurements to the UE 1*i*-01. QoE measurement configuration information for multimedia broadcast services may be included in the AppLayerMeasConfig. The QoE measurement configuration information for multimedia broadcast services may be applied in all RRC states (RRC_IDLE, RRC_INACTIVE, and RRC_CONNECTED). Of course, a separate indicator may be added to apply to RRC_INACTIVE and RRC_IDLE. Additionally, the QoE measurement configuration information for multimedia broadcast services may include a new timer value. As an example, upon receiving ApplayerMeasConfig, the UE 1*i*-01 may drive or re-drive a new timer with the received new timer value. Alternatively, the UE 1*i*-01 may drive or re-drive the new timer with the new timer value received when transitioning to the RRC idle mode or the RRC inactive mode. The UE 1*i*-01** may release the QoE measurement configuration information for multimedia broadcast services when the driven timer expires. Of course, the QoE measurement results for multimedia broadcast services may also be released together.

In operation **1*i*-20, the base station 1*i*-02 may transmit an RRC connection release message (RRCRelease) to the UE 1*i*-01**.

In operation **1*i*-25, the UE 1*i*-01 may transition to the RRC idle mode (RRC_IDLE) or RRC inactive mode (RRC_INACTIVE). When the suspended configuration information (suspendConfig) is included in the RRC connection release message received in operation 1*i*-20, the UE 1*i*-01** may transition to the RRC inactive mode, otherwise the UE may transition to the RRC idle mode.

In operation **1*i*-30, the UE 1*i*-01 in the RRC idle mode or the RRC inactive mode may obtain system information by camping on a suitable cell. In the system information, an indicator indicating whether a UE configured for QoE measurement for multimedia broadcast services should perform QoE measurement for multimedia broadcast services may be broadcast. For example, the UE may perform the QoE measurement for multimedia broadcast services only when the indicator is broadcasted in the system information. Additionally, in the system information, an indicator indicating whether the UE 1*i*-01 should report an indicator indicating that there is QoE measurement result information for multimedia broadcast services to the base station 1*i*-02 after the UE 1*i*-01** transitions to the RRC connected mode may be separately broadcast. Of course, a single indicator indicating whether the QoE measurement should be performed for multimedia broadcast services and the QoE measurement result information for this may be broadcast in the system information.

In operation **1*i*-35, the UE 1*i*-01** in the RRC idle mode or the RRC inactive mode may receive multimedia broadcast services according to the above-described embodiment.

In operation **1*i*-40, the UE 1*i*-01** in the RRC idle mode or the RRC inactive mode may perform application layer measurements for multimedia broadcast services (i.e., QoE measurements for multimedia broadcast services).

In operation 1i-45, the UE 1i-01 in the RRC idle mode or the RRC inactive mode may transition to the RRC connected mode through an RRC connection setup or RRC connection resume procedure with the base station 1i-02. For example, the UE in the RRC idle mode may perform the RRC connection configuration procedure, and the UE in the RRC inactive mode may perform the RRC connection resume procedure.

In operation 1i-50, the UE 1i-01 in the RRC connected mode may transmit an RRC connection setup complete message (RRCSetupComplete) or an RRC connection resume complete message (RRCResumeComplete) to the base station 1i-02. The message may include an indicator that there is a QoE measurement value for multimedia broadcast services. When there is the indicator to report the QoE measurement value for multimedia broadcast services in the system information obtained in operation 1i-30, the UE 1i-01 may include an indicator indicating that the QoE measurement value for multimedia broadcast services is present in the RRC connection setup complete message or the RRC connection resume complete message. This is to prevent the UE 1i-01 from unnecessarily transmitting the indicator that there is a QoE measurement value for multimedia broadcast services to a cell that does not understand the QoE measurement value for multimedia broadcast services.

In operation 1i-55, the RRC connected mode UE 1i-01 may transmit a predetermined RRC message (e.g., MeasurementReportAppLayer) containing QoE measurement result information to the base station 1i-02. The RRC message may include QoE measurement result information for multimedia broadcast services measured in the RRC idle mode or the RRC inactive mode. The QoE measurement result information for multimedia broadcast services measured in the RRC idle mode or the RRC inactive mode through a separate indicator or new IE may be included in the predetermined RRC message to distinguish QoE measurement result information for multimedia broadcast services measured in the RRC connected mode from QoE measurement result information for multimedia broadcast services measured in the RRC idle mode or the RRC inactive mode. Of course, as in the above-described embodiment of the disclosure, the QoE measurement result information for multimedia broadcast services measured in the RRC idle mode or the RRC inactive mode may be included in the UE information response message (UEInformationResponse). For example, this case is limited to the case where the base station includes the indicator to report the QoE measurement result information for multimedia broadcast services in the UE information request message (UEInformationRequest).

Figure 10:
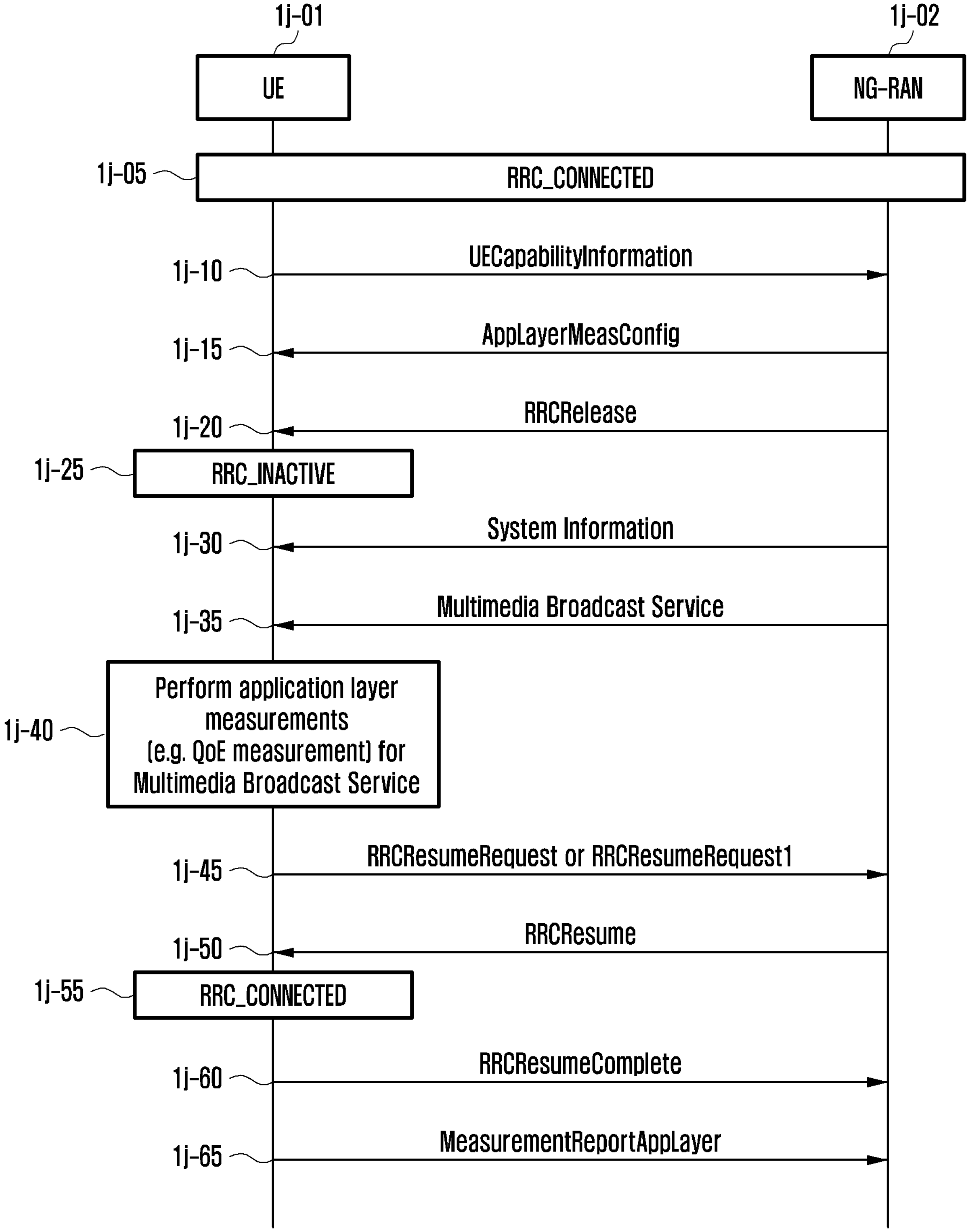
FIG. 10 is a diagram illustrating measurement and reporting of a UE for an MBS service according to an embodiment of the disclosure.

FIG. 10 is a diagram illustrating measurement and reporting of a UE for an MBS service according to an embodiment of the disclosure.

Referring to FIG. 10, a UE 1j-01 may be in an RRC connected mode (RRC_CONNECTED) by configuring an RRC connection with a base station 1j-02 in operation 1j-05.

In operation 1j-10, the UE 1j-01 may transmit a UE capability information message (UECapabilityInformation) to the base station 1j-02. Information included in the message may follow the above-described embodiments. As an example, the message may include information indicating that QoE measurement may be performed for multimedia broadcast services in an RRC idle mode (RRC_IDLE) or an RRC inactive mode (RRC_INACTIVE).

In operation 1j-15, the base station 1j-02 may transmit a predetermined RRC message (e.g., RRCResume or RRCReconfiguration) including configuration information (AppLayerMeasConfig) for application layer measurements to the UE 1j-01. QoE measurement configuration information for multimedia broadcast services may be included in the AppLayerMeasConfig. The QoE measurement configuration information for multimedia broadcast services may be applied in all RRC states (RRC_IDLE, RRC_INACTIVE, and RRC_CONNECTED). Of course, a separate indicator may be added to the AppLayerMeasConfig to apply to RRC_INACTIVE and RRC_IDLE. Additionally, the QoE measurement configuration information for multimedia broadcast services may include a new timer value. As an example, upon receiving ApplayerMeasConfig, the UE 1j-01 may drive or re-drive a new timer with the received new timer value. Alternatively, the UE 1j-01 may drive or re-drive the new timer with the new timer value received when transitioning to the RRC idle mode or the RRC inactive mode. The UE 1j-01 may release the QoE measurement configuration information for multimedia broadcast services when the driven timer expires. Of course, the QoE measurement results for multimedia broadcast services may also be released together.

In operation 1j-20, the base station 1j-02 may transmit an RRC connection release message (RRCRelease) including suspended configuration information to the UE 1j-01.

In operation 1j-25, the UE 1j-01 may transition to the RRC idle mode (RRC_IDLE) or RRC inactive mode (RRC_INACTIVE).

In operation 1j-30, the UE 1i-01 in the RRC inactive mode may obtain system information by camping on a suitable cell. In the system information, an indicator indicating whether the UE 1j-01 configured for QoE measurement for multimedia broadcast services should perform QoE measurement for multimedia broadcast services may be broadcast. For example, the UE 1j-01 may perform the QoE measurement for multimedia broadcast services only when the indicator is broadcasted in the system information. Additionally, in the system information, an indicator indicating whether the UE 1i-01 should report an indicator indicating that there is QoE measurement result information for multimedia broadcast services to the base station 1j-02 after the UE 1j-01 transitions to the RRC connected mode may be separately broadcast. Of course, a single indicator indicating whether the QoE measurement should be performed for multimedia broadcast services and the QoE measurement result information for this may be broadcast in the system information.

In operation 1j-35, the UE 1j-01 in the RRC inactive mode may receive multimedia broadcast services according to the above-described embodiment.

In operation 1j-40, the UE 1j-01 in the RRC inactive mode may perform application layer measurements for multimedia broadcast services (i.e., QoE measurements for multimedia broadcast services).

In operation 1j-45, the UE 1j-01 in the RRC inactive mode may initiate an RRC connection resume procedure and transmit an RRC connection resume request message (RRCResumeRequest or RRCResumeRequestl) to the base station 1j-02.

In operation 1j-50, the base station 1j-02 may transmit an RRC connection resume message (RRCResume) to the UE 1j-01. The message may include an indicator to report a QoE measurement value for multimedia broadcast services.

In operation 1j-55, the UE 1j-01 may apply the RRC connection resume message received in step 1j-50 and transition to the RRC connected mode.

In operation 1j-60, the UE 1j-01 may transmit an RRC connection resume completion message (RRCResumeComplete) to the base station **1*j*-02. The message may include QoE measurement result information for multimedia broadcast services measured in the RRC idle mode or the RRC inactive mode. For example, when the RRC connection resume message received in operation 1*j*-50 includes an indicator to report the QoE measurement value for multimedia broadcast services, the UE 1*j*-01 may store the QoE measurement result information for multimedia broadcast services measured in the RRC idle mode or the RRC inactive mode in the RRC connection resume completion message. If the RRC connection resume message received in operation 1*j*-50 does not include an indicator to report the QoE measurement value for multimedia broadcast services, as in the above-described embodiment of the disclosure, the UE 1*j*-01** may include and transmit the RRC connection resume complete message (RRCResumeComplete) with an indicator indicating that there is a QoE measurement value for multimedia broadcast services.

In operation **1*j*-65, the UE 1*j*-01 may transmit a predetermined RRC message (e.g., MeasurementReportAppLayer) containing QoE measurement result information to the base station 1*j*-02. The RRC message may include QoE measurement result information for multimedia broadcast services measured in the RRC idle mode or the RRC inactive mode. The QoE measurement result information for multimedia broadcast services measured in the RRC idle mode or the RRC inactive mode through a separate indicator or new IE may be included in the predetermined RRC message to distinguish QoE measurement result information for multimedia broadcast services measured in the RRC connected mode from QoE measurement result information for multimedia broadcast services measured in the RRC idle mode or the RRC inactive mode. Of course, as in the above-described embodiment of the disclosure, the QoE measurement result information for multimedia broadcast services measured in the RRC idle mode or the RRC inactive mode may be included in the UE information response message (UEInformationResponse). For example, this case is limited to the case where the base station 1*j*-02** includes the indicator to report the QoE measurement result information for multimedia broadcast services in the UE information request message (UEInformationRequest).

Figure 11:
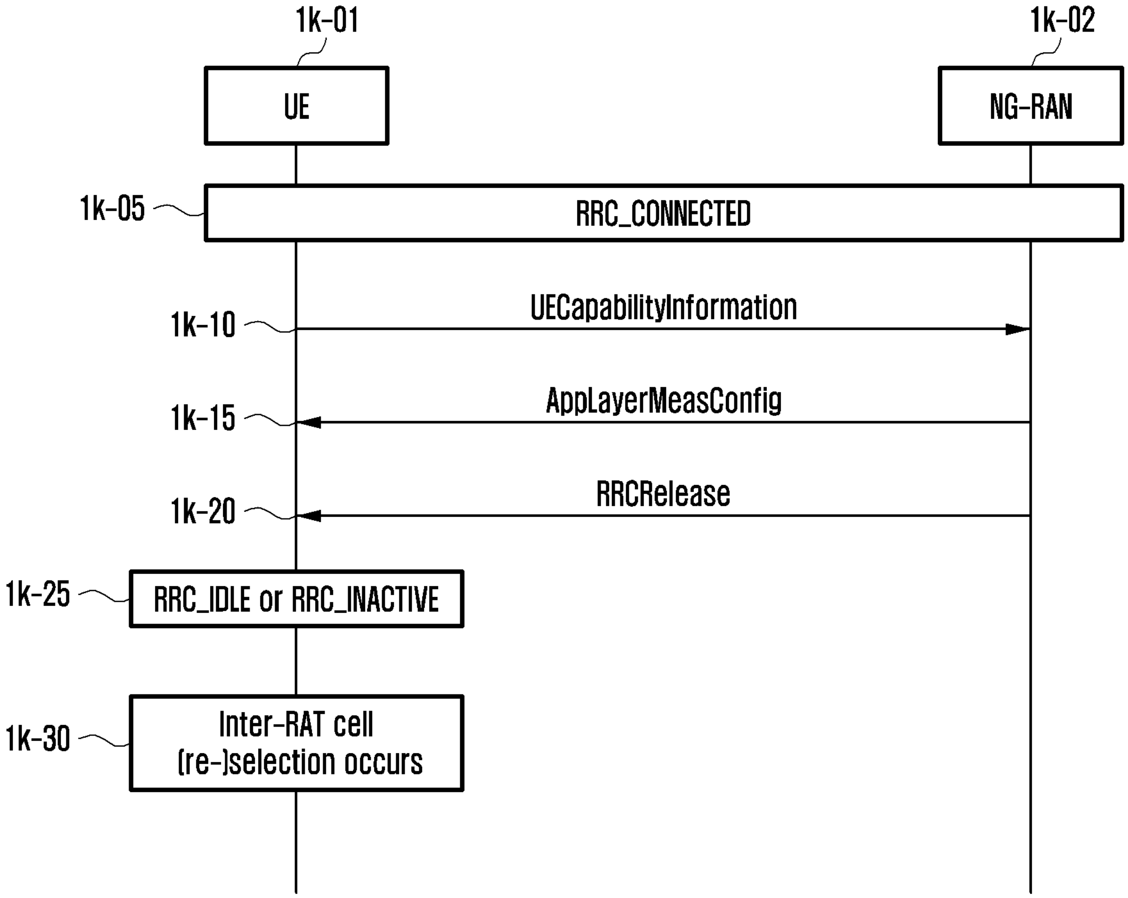
FIG. 11 is a diagram illustrating measurement and reporting of a UE for an MBS service according to an embodiment of the disclosure.

FIG. 11 is a diagram illustrating measurement and reporting of a UE for an MBS service according to an embodiment of the disclosure.

Referring to FIG. 11, a UE **1*k*-01 may be in an RRC connected mode (RRC_CONNECTED) by configuring an RRC connection with a base station 1*k*-02 in operation 1*k*-05**.

In operation **1*k*-10, the UE 1*k*-01 may transmit a UE capability information message (UECapabilityInformation) to the base station 1*k*-02**. Information included in the message may follow the above-described embodiments. As an example, the message may include information indicating that QoE measurement may be performed for multimedia broadcast services in an RRC idle mode (RRC_IDLE) or an RRC inactive mode (RRC_INACTIVE).

In operation **1*k*-15, the base station 1*k*-02 may transmit a predetermined RRC message (e.g., RRCResume or RRCReconfiguration) including configuration information (AppLayerMeasConfig) for application layer measurements to the UE 1*k*-01. QoE measurement configuration information for multimedia broadcast services may be included in the AppLayerMeasConfig. The QoE measurement configuration information for multimedia broadcast services may be applied in all RRC states (RRC_IDLE, RRC_INACTIVE, and RRC_CONNECTED). Of course, a separate indicator may be added to apply to RRC_INACTIVE and RRC_IDLE. Additionally, the QoE measurement configuration information for multimedia broadcast services may include a new timer value. As an example, upon receiving ApplayerMeasConfig, the UE 1*k*-01 may drive or re-drive a new timer with the received new timer value. Alternatively, the UE 1*k*-01 may drive or re-drive the new timer with the new timer value received when transitioning to the RRC idle mode or the RRC inactive mode. The UE 1*k*-01** may release the QoE measurement configuration information for multimedia broadcast services when the driven timer expires. Of course, the QoE measurement results for multimedia broadcast services may also be released together.

In operation **1*k*-20, the base station 1*k*-02 may transmit an RRC connection release message (RRCRelease) to the UE 1*k*-01**.

In operation **1*k*-25, the UE 1*k*-01 may transition to the RRC idle mode (RRC_IDLE) or RRC inactive mode (RRC_INACTIVE). When the suspended configuration information (suspendConfig) is included in the RRC connection release message received in operation 1*k*-20, the UE 1*k*-01** may transition to the RRC inactive mode, otherwise the UE may transition to the RRC idle mode.

In operation **1*k*-30, the UE 1*k*-01** in the RRC idle mode or the RRC inactive mode may select or reselect an inter-RAT cell through a cell selection or cell reselection procedure.

In operation **1*k*-35, the UE 1*k*-01** may release QoE measurement configuration information for multimedia broadcast services. Additionally, the QoE measurement result value for multimedia broadcast services may also be released. Alternatively, the running timer for QoE measurement configuration for multimedia broadcast services may also be stopped.

Figure 12:
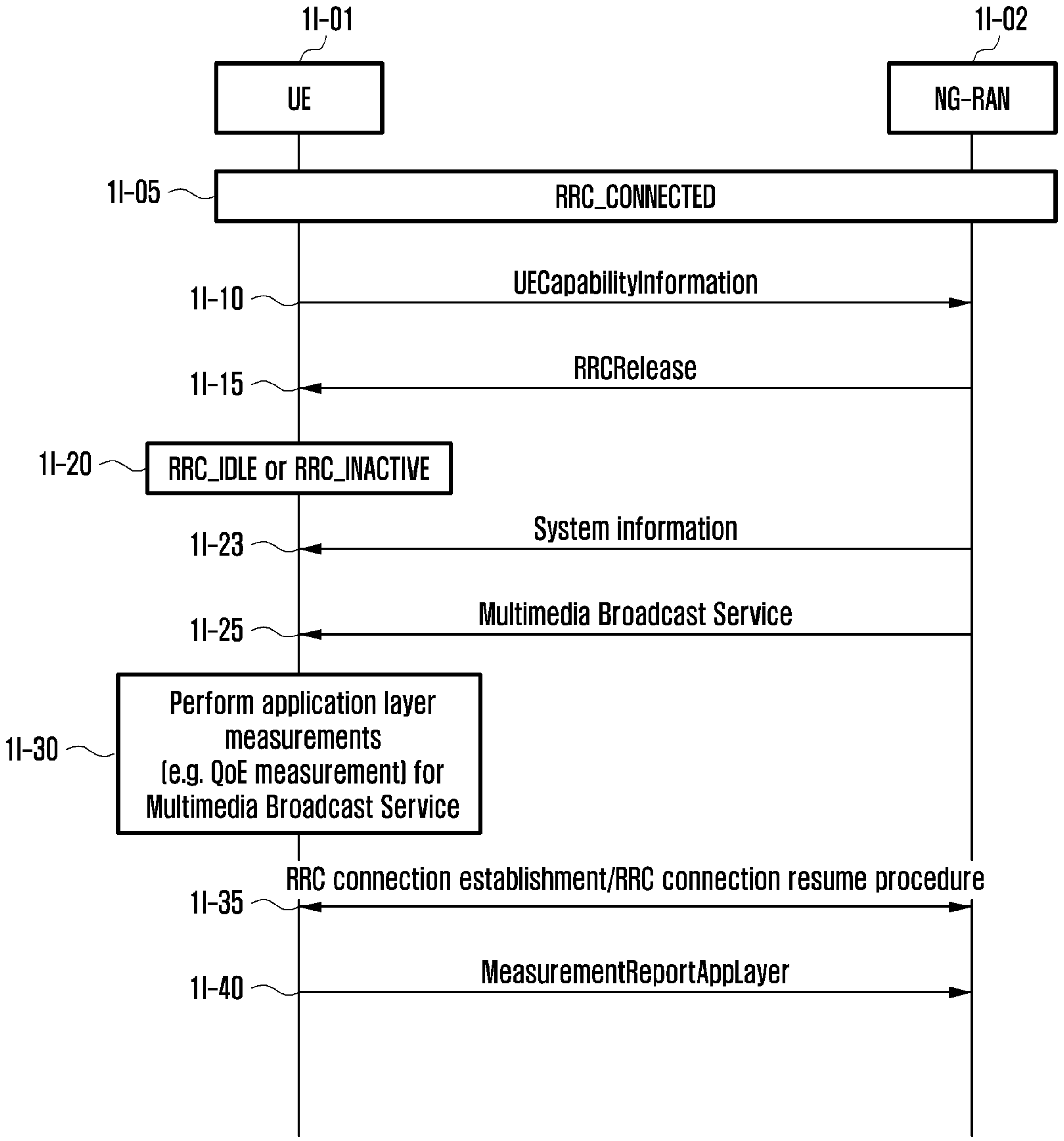
FIG. 12 is a diagram illustrating measurement and reporting of a UE for an MBS service according to an embodiment of the disclosure.

FIG. 12 is a diagram illustrating measurement and reporting of a UE for an MBS service according to an embodiment of the disclosure.

Referring to FIG. 12, a UE **1*l*-01 may be in an RRC connected mode (RRC_CONNECTED) by configuring an RRC connection with a base station 1*l*-02 in operation 1*l*-05**.

In operation **1*l*-10, the UE 1*l*-01 may transmit a UE capability information message (UECapabilityInformation) to the base station 1*l*-02**. Information included in the message may follow the above-described embodiments. As an example, the message may include information indicating that QoE measurement may be performed for multimedia broadcast services in an RRC idle mode (RRC_IDLE) or an RRC inactive mode (RRC_INACTIVE).

In operation **1*l*-15, the base station 1*l*-02 may transmit an RRC connection release message (RRCRelease) to the UE 1*l*-01**. The message may include QoE measurement configuration information for multimedia broadcast services. Additionally, the message may include at least one of the following.

New timer value

The UE may drive or re-drive a new timer with the new timer value. When the new timer is running, the UE may perform QoE measurement for multimedia broadcast services by applying QoE measurement configuration information for multimedia broadcast services. If the new timer expires, the UE may stop measuring QoE for multimedia broadcast services. Alternatively, when the new timer expires, the QoE measurement result for multimedia broadcast services may be released.

Validity area

The validity area may consist of one or a plurality of frequencies, and may include a cell list for each frequency (of course, if there is no cell list, all cells in the corresponding frequency may belong to the validity area). Alternatively, the validity area may include one or a plurality of tracking area codes (TACs) or RAN area codes (RANACs). The UE may perform QoE measurement configuration for multimedia broadcast services in a cell belonging to the validity area. When selecting or reselecting a cell out of the validity area, the UE may release the QoE measurement configuration information for multimedia broadcast services. In this case, the running new timer may also be stopped.

QoE measurement frequency/cell list

The QoE measurement frequency/cell list may consist of one or a plurality of frequencies, and a cell list for each frequency may also be included (alternatively, it may consist of only one or a plurality of cell lists). The UE may perform QoE measurement for multimedia broadcast services in the indicated QoE measurement frequency/cell list. If the QoE measurement frequency/cell list is not included, when the cell provides multimedia broadcast services, the UE may perform the QoE measurement for multimedia broadcast services.

For reference, when the UE is able to perform QoE measurement for other services as well as multimedia broadcast services in the RRC idle mode or the RRC inactive mode, the above-described information may be separately signaled in the RRC connection release message.

In operation **1*l*-20, the UE 1*l*-01 may apply the RRC connection release message received in operation 1*l*-15** and transit to the RRC idle mode or the RRC inactive mode.

In operation **1*l*-23, the UE 1*l*-01 in the RRC idle mode or the RRC inactive mode may obtain system information by camping on a suitable cell. In the system information, QoE measurement configuration information for multimedia broadcast services may be broadcast. In operation 1*l*-15**, the UE receiving the RRC connection release message including the QoE measurement configuration information for multimedia broadcast services may ignore the QoE measurement configuration information for multimedia broadcast services in the system information and apply QoE measurement configuration information for multimedia broadcast services included in the RRC connection release message. Otherwise (when the QoE measurement configuration information for multimedia broadcast services is not included in the RRC disconnection message or is released), the UE may apply QoE measurement configuration information to multimedia broadcast services broadcasted in system information.

In operation **1*l*-25, the UE 1*l*-01** in the RRC idle mode or the RRC inactive mode may receive multimedia broadcast services according to the above-described embodiment.

In operation **1*l*-30**, the UE in RRC idle mode or the RRC inactive mode may perform application layer measurements for multimedia broadcast services (i.e., QoE measurements for multimedia broadcast services).

In operation **1*l*-35, the UE 1*l*-01 in the RRC idle mode or the RRC inactive mode may transition to the RRC connected mode through an RRC connection setup or RRC connection resume procedure with the base station 1*l*-02. The UE in the RRC idle mode may perform the RRC connection setup procedure, and the UE in the RRC inactive mode may perform the RRC connection resume procedure. When transitioning to the RRC connected mode, the UE 1*l*-01** may release the QoE measurement configuration information for multimedia broadcast services configured through an RRC connection release message. Of course, when the new timer is running, the new timer may be released.

In operation **1*l*-40, the UE 1*l*-01 may transmit a predetermined RRC message (e.g., MeasurementReportAppLayer) containing QoE measurement result information to the base station 1*l*-02**. The RRC message may include QoE measurement result information for multimedia broadcast services measured in the RRC idle mode or the RRC inactive mode. The QoE measurement result information for multimedia broadcast services measured in the RRC idle mode or the RRC inactive mode through a separate indicator or new IE may be included in the predetermined RRC message to distinguish QoE measurement result information for multimedia broadcast services measured in the RRC connected mode from QoE measurement result information for multimedia broadcast services measured in the RRC idle mode or the RRC inactive mode. Of course, as in the above-described embodiment of the disclosure, the QoE measurement result information for multimedia broadcast services measured in the RRC idle mode or the RRC inactive mode may be included in the UE information response message (UEInformationResponse). For example, this case is limited to the case where the base station includes the indicator to report the QoE measurement result information for multimedia broadcast services in the UE information request message (UEInformationRequest).

Figure 13:
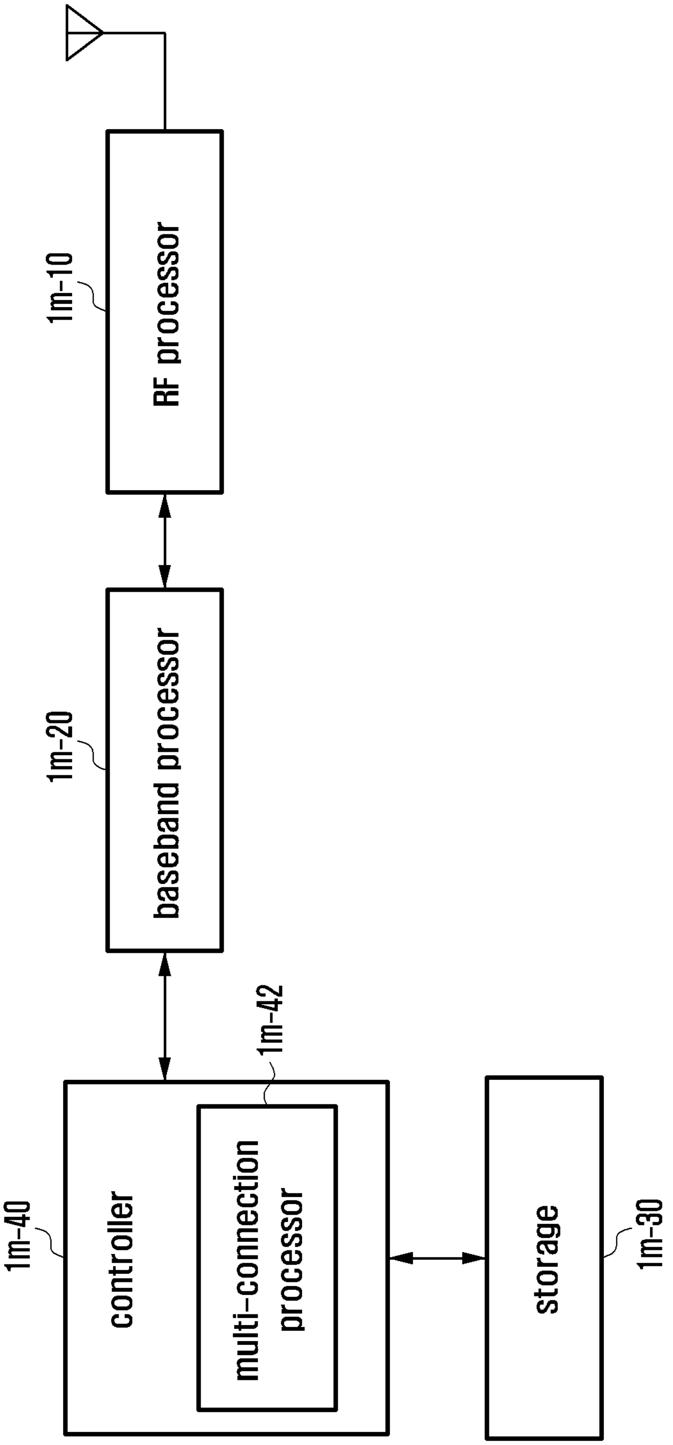
FIG. 13 is a block diagram illustrating an internal structure of a UE according to an embodiment of the disclosure.

FIG. 13 is a block diagram illustrating an internal structure of a UE according to an embodiment of the disclosure.

Referring to FIG. 13, the UE includes a radio frequency (RF) processor **1*m*-10, a baseband processor 1*m*-20, a storage 1*m*-30, and a controller 1*m*-40**.

The RF processor **1*m*-10 performs a function for transmitting and receiving a signal through a radio channel, such as band conversion and amplification of a signal. For example, the RF processor 1*m*-10 up-converts a baseband signal provided from the baseband processor 1*m*-20 into an RF band signal, transmits the RF band signal through an antenna, and down-converts the RF band signal received through the antenna to the baseband signal. For example, the RF processor 1*m*-10 may include a transmission filter, a reception filter, an amplifier, a mixer, an oscillator, a digital to analog converter (DAC), an analog to digital converter (ADC), or the like. In the diagram, only one antenna is illustrated, but the UE may include a plurality of antennas. In addition, the RF processor 1*m*-10 may include a plurality of RF chains. Furthermore, the RF processor 1*m*-10 may perform beamforming. For the beamforming, the RF processor 1*m*-10** may adjust the phase and magnitude of each of signals transmitted and received through a plurality of antennas or antenna elements. In addition, the RF processor may perform MIMO, and may receive multiple layers when performing the MIMO operation.

The baseband processor **1*m*-20 performs a function of converting between a baseband signal and a bit stream according to a physical layer standard of the system. For example, when transmitting data, the baseband processor 1*m*-20 generates complex symbols by encoding and modulating a transmitted bit stream. In addition, when receiving data, the baseband processor 1*m*-20 restores a received bit stream by demodulating and decoding the baseband signal provided from the RF processor 1*m*-10. For example, in the case of following an orthogonal frequency division multiplexing (OFDM) scheme, when transmitting data, the baseband processor 1*m*-20 generates complex symbols by encoding and modulating a transmitted bit stream, maps the complex symbols to subcarriers, and then configures OFDM symbols through an inverse fast Fourier transform (IFFT) operation and cyclic prefix (CP) insertion. In addition, when receiving data, the baseband processor 1*m*-20 divides the baseband signal provided from the RF processor 1m-10** into OFDM symbol units, restores signals mapped to subcarriers through a fast Fourier transform (FFT) operation, and then restores a received bit stream through demodulation and decoding.

The baseband processor 1m-20 and the RF processor 1m-10 transmits and receives signals as described above. Accordingly, the baseband processor 1m-20 and the RF processor 1m-10 may be referred to as a transmitter, a receiver, a transceiver, or a communicator. Furthermore, at least one of the baseband processor 1m-20 and the RF processor 1m-10 may include a plurality of communication modules to support a plurality of different radio access technologies. In addition, at least one of the baseband processor 1m-20 and the RF processor 1m-10 may include different communication modules to process signals of different frequency bands. For example, the different radio access technologies may include a wireless LAN (e.g., IEEE 802.11), a cellular network (e.g., LTE), or the like. In addition, the different frequency bands may include a super high frequency (SHF) (e.g., 2.NRHz, NRhz) band and a millimeter wave (e.g., 60 GHz) band.

The storage 1m-30 stores data, such as a basic program, an application program, and configuration information for the operation of the UE. More particularly, the storage 1m-30 may store information related to a second access node performing wireless communication by using the second radio access technology. In addition, the storage 1m-30 provides stored data according to the request of the controller 1m-40.

The controller 1m-40, which may include a multi-connection processor 1m-42, controls overall operations of the UE. For example, the controller 1m-40 transmits and receives signals through the baseband processor 1m-20 and the RF processor 1m-10. In addition, the controller 1m-40 writes data in the storage 1m-30 and reads the data. To this end, the controller 1m-40 may include at least one processor. For example, the controller 1m-40 may include a communication processor (CP) that controls for communication and an application processor (AP) that controls an upper layer, such as an application program.

Figure 14:
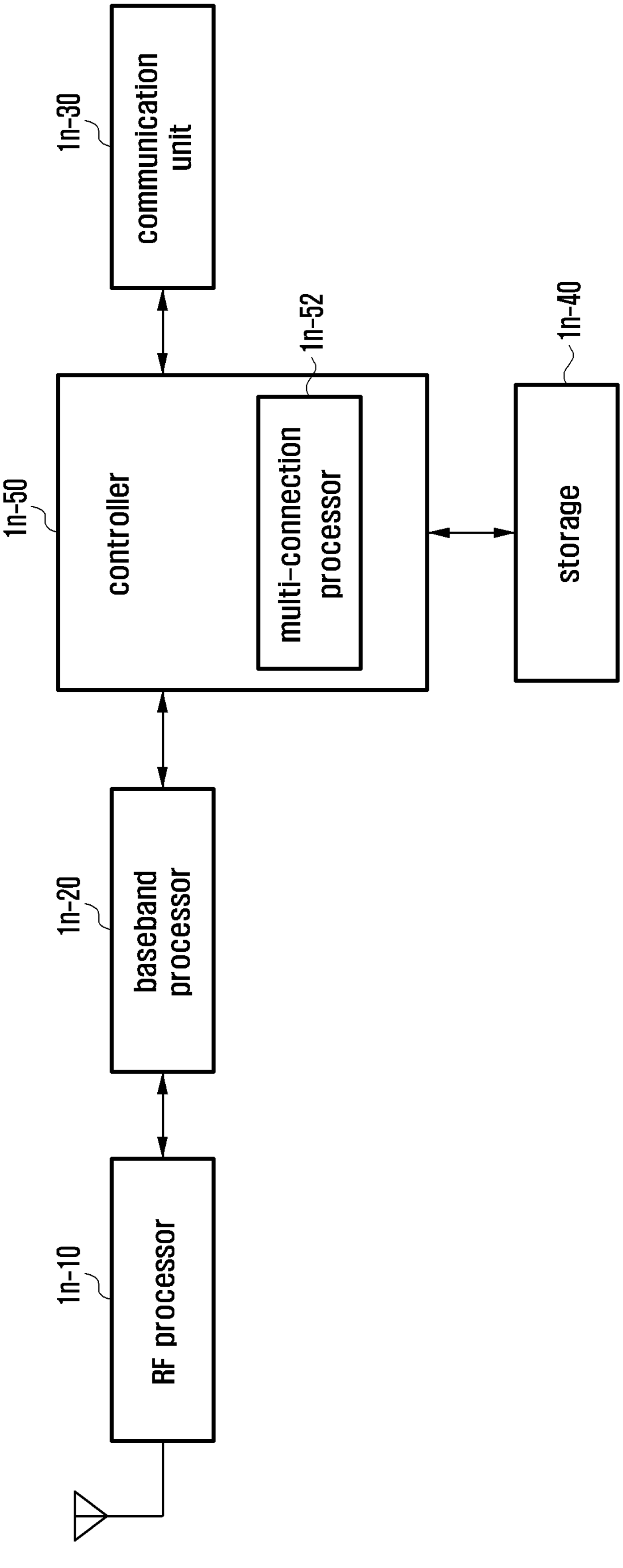
FIG. 14 is a block diagram illustrating a configuration of a new radio (NR) base station according to an embodiment of the disclosure.

FIG. 14 is a block diagram illustrating a configuration of an NR base station according to an embodiment of the disclosure.

Referring to FIG. 14, the base station is configured including an RF processor 1n-10, a baseband processor 1n-20, a backhaul communicator 1n-30, a storage 1n-40, and a controller 1n-50.

The RF processor 1n-10 performs a function for transmitting and receiving a signal through a radio channel, such as band conversion and amplification of the signal. For example, the RF processor 1n-10 up-converts the baseband signal provided from the baseband processor 1n-20 into an RF band signal, transmits the same through an antenna, and down-converts the RF band signal received through the antenna into a baseband signal. For example, the RF processor 1n-10 may include a transmission filter, a reception filter, an amplifier, a mixer, an oscillator, a DAC, an ADC, and the like. Although only one antenna is illustrated in the diagram, the first access node may include a plurality of antennas. In addition, the RF processor 1n-10 may include a plurality of RF chains. Furthermore, the RF processor 1n-10 may perform beamforming. For the beamforming, the RF processor 1n-10 may adjust the phase and magnitude of each of signals transmitted and received through a plurality of antennas or antenna elements. The RF processor may perform a downlink MIMO operation by transmitting one or more layers.

The baseband processor 1n-20 performs a function of converting between a baseband signal and a bit stream according to the physical layer standard of the first radio access technology. For example, when transmitting data, the baseband processor 1n-20 generates complex symbols by encoding and modulating a transmitted bit stream. In addition, when receiving data, the baseband processor 1n-20 restores a received bit stream through demodulating and decoding the baseband signal provided from the RF processor 1n-10. For example, in the case of following the OFDM scheme, when transmitting data, the baseband processor 1n-20 generates complex symbols by encoding and modulating a transmitted bit stream, maps the complex symbols to subcarriers, and then configures OFDM symbols through IFFT operation and CP insertion. In addition, when receiving data, the baseband processor 1n-20 divides the baseband signal provided from the RF processor 1n-10 into OFDM symbol units, restores signals mapped to subcarriers through FFT operation, and then restores a received bit stream through demodulation and decoding. The baseband processor 1n-20 and the RF processor 1n-10 transmits and receives signals as described above. Accordingly, the baseband processor 1n-20 and the RF processor unit 1n-10 may be referred to as a transmitter, a receiver, a transceiver, a communicator, or a wireless communicator.

The backhaul communicator 1n-30 provides an interface for performing communication with other nodes in the network. For example, the backhaul communicator 1n-30 converts a bit stream transmitted from the main base station to another node, for example, an auxiliary base station, a core network, or the like, into a physical signal, and converts a physical signal received from the other node into a bit stream.

The storage 1n-40 stores data, such as a basic program, an application program, and configuration information for the operation of the main base station. More particularly, the storage 1n-40 may store information on a bearer allocated to an accessed UE, a measurement result reported from the accessed UE, and the like. In addition, the storage 1n-40 may store information serving as a criterion for determining whether to provide or stop multiple connections to the UE. In addition, the storage 1n-40 provides stored data according to the request of the controller 1n-50.

The controller 1n-50, which may include a multi-connection processor 1n-52, controls overall operations of the main base station. For example, the controller 1n-50 transmits and receives signals through the baseband processor 1n-20 and the RF processor 1n-10 or through the backhaul communicator 1n-30. In addition, the controller 1n-50 writes data in the storage 1n-40 and reads the data. To this end, the controller 1n-50 may include at least one processor.

In the above-described embodiments of the disclosure, an element included in the disclosure is expressed in the singular or the plural according to presented embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:

receiving, from a first base station, a radio resource control (RRC) message including configuration information on a plurality of configurations for an application layer measurement, the configuration information including information on a timer value indicating a duration for quality of experience (QoE) measurements and information on a validity area for the application layer measurement, wherein the timer value and the validity area are configured with at least one configuration among the plurality of configurations;

transitioning from an RRC connected state to an RRC inactive state;

starting a timer with the timer value based on transition to the RRC inactive state, wherein the timer is used for releasing the at least one configuration based on expiration;

generating a plurality of reports of the application layer measurement based on the plurality of configurations while the timer is running;

in case that a cell outside of the validity area is selected based on cell reselection, stopping the timer;

releasing the at least one configuration based on the timer being stopped;

receiving, from a second base station associated with the cell, an RRC resume message including information to report the application layer measurement;

transmitting, to the second base station associated with the cell, an RRC resume complete message; and transmitting, to the second base station associated with the cell, a report of the application layer measurement, after a transmission of the RRC resume complete message, wherein at least one report among the plurality of reports is discarded based on release of the at least one configuration.

2. The method of claim 1, wherein the configuration information further includes an application layer measurement configuration for the RRC connected state, and wherein a configuration for the application layer measurement is used for the QoE measurements of a multicast broadcast service (MBS) broadcast service.

3. The method of claim 1, further comprising:

transmitting, to the first base station, capability information including information indicating that the UE supports the QoE measurements in the RRC inactive state and an RRC idle state.

4. The method of claim 1, wherein the RRC resume complete message includes information indicating that the UE has information associated with a configuration for the application layer measurement.

5. A user equipment (UE) in a wireless communication system, the UE comprising:

a transceiver; and at least one processor configured to:

control the transceiver to receive, from a first base station, a radio resource control (RRC) message including configuration information on a plurality of configurations for an application layer measurement, the configuration information including information on a timer value indicating a duration for quality of experience (QoE) measurements and information on a validity area for the application layer measurement, wherein the timer value and the validity area are configured with at least one configuration among the plurality of configurations, transition from an RRC connected state to an RRC inactive state, start a timer with the timer value based on transition to the RRC inactive state, wherein the timer is used for releasing the at least one configuration based on expiration, generating a plurality of reports of the application layer measurement based on the plurality of configurations while the timer is running, in case that a cell outside of the validity area is selected based on cell reselection, stop the timer, release at least one configuration based on the timer being stopped, control the transceiver to receive, from a second base station associated with the cell, an RRC resume message including information to report the application layer measurement, control the transceiver to transmit, to the second base station associated with the cell, an RRC resume complete message, and control the transceiver to transmit, to the second base station associated with the cell, a report of the application layer measurement, after a transmission of the RRC resume complete message, wherein at least one report among the plurality of reports of the application layer measurement is discarded based on release of the at least one configuration.

6. The UE of claim 5, wherein the configuration information further includes an application layer measurement configuration for the RRC connected state, and wherein a configuration for the application layer measurement is used for the QoE measurements of a multicast broadcast service (MBS) broadcast service.

7. The UE of claim 5, wherein the at least one processor is further configured to control the transceiver to transmit, to the first base station, capability information including information indicating that the UE supports the QoE measurements in the RRC inactive state and an RRC idle state.

8. The UE of claim 5, wherein the RRC resume complete message includes information indicating that the UE has information associated with a configuration for the application layer measurement.

* * * * *